United States Patent
Yu et al.

(10) Patent No.: US 9,588,292 B2
(45) Date of Patent: Mar. 7, 2017

(54) INTEGRATED PHOTONIC DEVICES BASED ON WAVEGUIDES PATTERNED WITH OPTICAL ANTENNA ARRAYS

(71) Applicant: THE TRUSTEES OF COLUMBIA UNIVERSITY IN THE CITY OF NEW YORK, New York, NY (US)

(72) Inventors: Nanfang Yu, New York, NY (US); Zhaoyi Li, New York, NY (US); Myoung-Hwan Kim, Fishkill, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/977,741

(22) Filed: Dec. 22, 2015

(65) Prior Publication Data

US 2016/0195676 A1    Jul. 7, 2016

Related U.S. Application Data

(63) Continuation of application No. PCT/US2014/043882, filed on Jun. 24, 2014.
(Continued)

(51) Int. Cl.
*G02B 6/122* (2006.01)
*G02B 5/00* (2006.01)
(Continued)

(52) U.S. Cl.
CPC ........... *G02B 6/1226* (2013.01); *G02B 5/008* (2013.01); *G02B 6/105* (2013.01); *G02B 6/107* (2013.01);
(Continued)

(58) Field of Classification Search
CPC ...... G02B 6/12; G02B 6/12002; G02B 6/122; G02B 6/126; G02B 6/14; G02B 6/27
See application file for complete search history.

(56) References Cited

U.S. PATENT DOCUMENTS 6,078,288 A * 6/2000 Adams ............... B60T 7/042
342/372
6,700,550 B2 * 3/2004 Crowley ............. B82Y 20/00
343/792.5
(Continued)

FOREIGN PATENT DOCUMENTS

WO  WO 2013/033591 A1   3/2013
WO  WO 2013/057138 A1   4/2013
WO  WO 2013/057444 A1   4/2013

OTHER PUBLICATIONS

Hu, et al., "Nanoscale surface plasmon all-optical diode based on plasmonic slot waveguides", Plasmonics 6, No. 4 (2011): 619-624.
(Continued)

*Primary Examiner* — Daniel Petkovsek
(74) *Attorney, Agent, or Firm* — Baker Botts L.L.P.

(57) ABSTRACT

Integrated photonic devices including an optical waveguide patterned with an array of antennas are provided. The small footprint, lightweight, and broadband integrated photonic devices provided can be configured into waveguide mode converters, polarization rotators, perfect absorbers, photodetectors, optical power diodes, nonlinear optical elements, heat-assisted magnetic recorders, optical isolators, and optical circulators.

30 Claims, 19 Drawing Sheets

Related U.S. Application Data

(60) Provisional application No. 61/839,119, filed on Jun. 25, 2013, provisional application No. 61/842,260, filed on Jul. 2, 2013, provisional application No. 61/981,506, filed on Apr. 18, 2014.

(51) Int. Cl.
*G02B 6/27* (2006.01)
*G02F 1/35* (2006.01)
*G02B 6/10* (2006.01)
*G02B 6/14* (2006.01)
*G02B 6/12* (2006.01)
*G11B 5/60* (2006.01)
*G11B 5/00* (2006.01)

(52) U.S. Cl.
CPC ......... *G02B 6/2766* (2013.01); *G02F 1/3544* (2013.01); *G02B 6/102* (2013.01); *G02B 6/14* (2013.01); *G02B 2006/12147* (2013.01); *G02B 2006/12157* (2013.01); *G11B 5/6088* (2013.01); *G11B 2005/0021* (2013.01)

(56) References Cited

U.S. PATENT DOCUMENTS

| | | | |
|---|---|---|---|
| 6,714,742 B1 | 3/2004 | Hayee et al. | |
| 7,010,183 B2* | 3/2006 | Estes | B82Y 20/00 |
| | | | 359/333 |
| 7,263,247 B1 | 8/2007 | Hehlen et al. | |
| 7,825,364 B1* | 11/2010 | Hillis | B82Y 20/00 |
| | | | 250/208.2 |
| 2005/0110108 A1 | 5/2005 | Patel et al. | |
| 2005/0254750 A1 | 11/2005 | Narevicius | |
| 2006/0038168 A1* | 2/2006 | Estes | B82Y 10/00 |
| | | | 257/25 |
| 2010/0002989 A1 | 1/2010 | Tokushima | |
| 2010/0270460 A1 | 10/2010 | Hillis et al. | |
| 2010/0316327 A1 | 12/2010 | Montoya et al. | |
| 2011/0315898 A1 | 12/2011 | Capasso et al. | |
| 2012/0006981 A1 | 1/2012 | Van Dorpe et al. | |
| 2012/0154227 A1* | 6/2012 | Adlerstein | H01Q 21/0006 |
| | | | 343/703 |
| 2012/0281957 A1 | 11/2012 | Chamanzar et al. | |
| 2013/0142020 A1 | 6/2013 | Rawat | |
| 2014/0010547 A1* | 1/2014 | Dong | H04B 1/04 |
| | | | 398/116 |

OTHER PUBLICATIONS

International Search Report dated Mar. 12, 2015 in International Application No. PCT/US14/43882.
Kong, et al., "A theoretical study of a compact and highly efficient isolator consisting of nonlinear plasma and matching metamaterials", Laser Physics, 23(5), (2013). 055404.
Ren, et al., "All-optical diode based on plasmonic attenuation and nonlinear frequency conversion", arXiv preprint arXiv:1210.3242.
Xu, et al., "Asymmetric light propagation in composition-graded semiconductor nanowires", Scientific reports (2012). 2.

\* cited by examiner

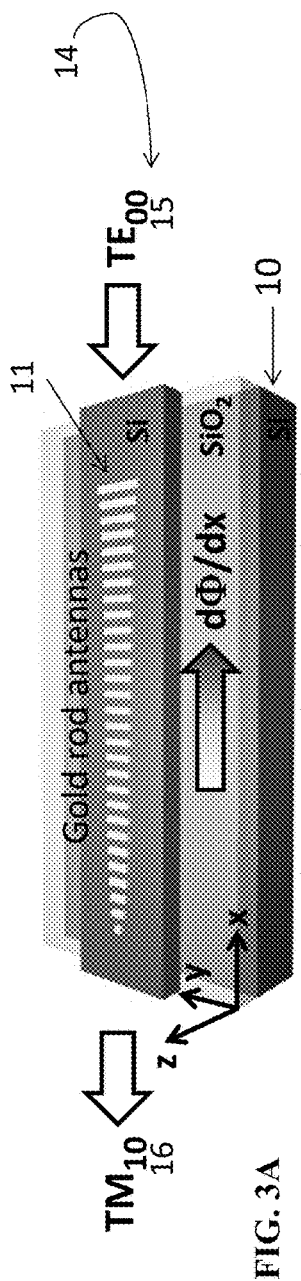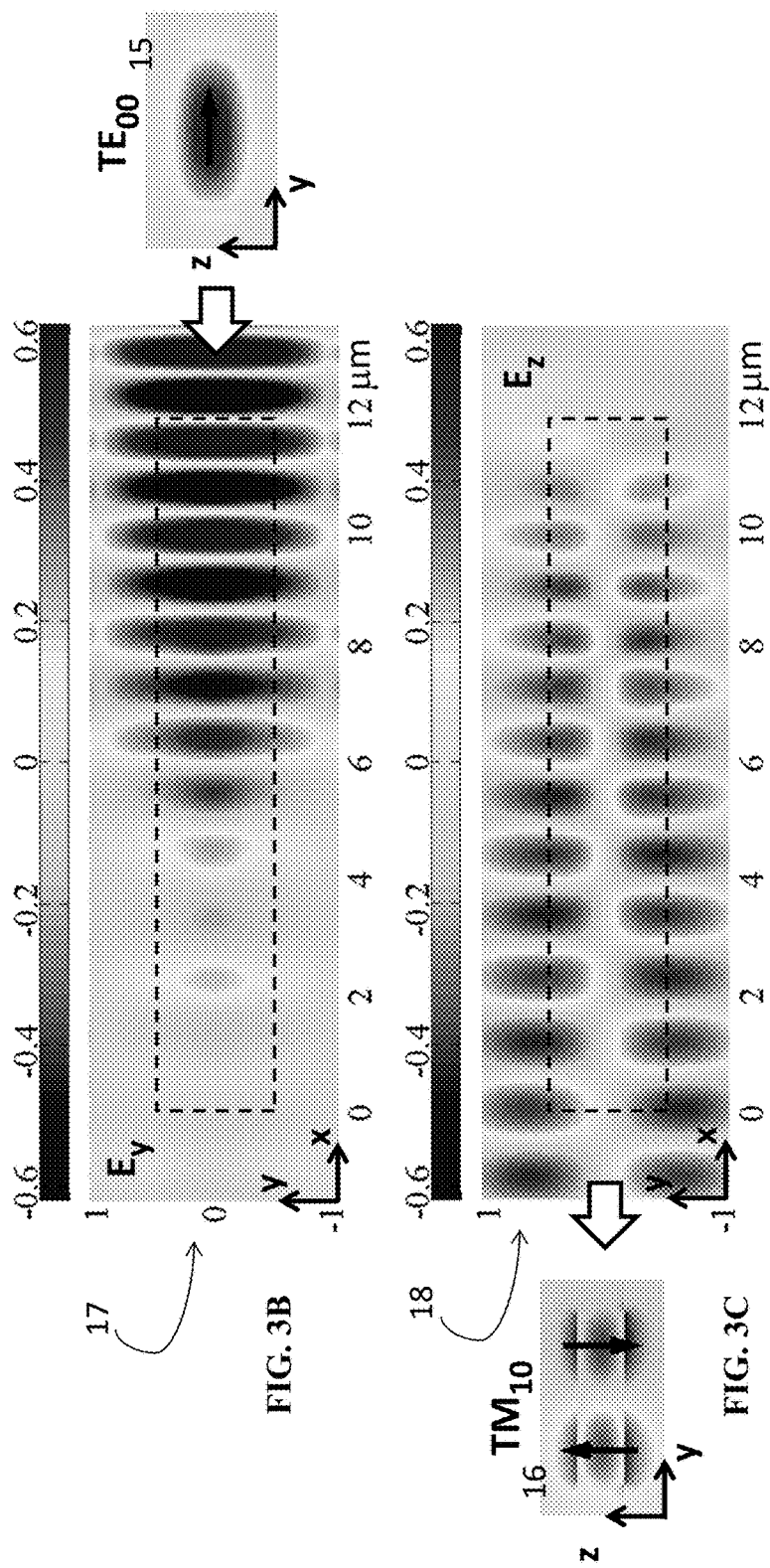
FIG. 3A
FIG. 3B
FIG. 3C

FIG. 5A
FIG. 5B
FIG. 5C
FIG. 5D

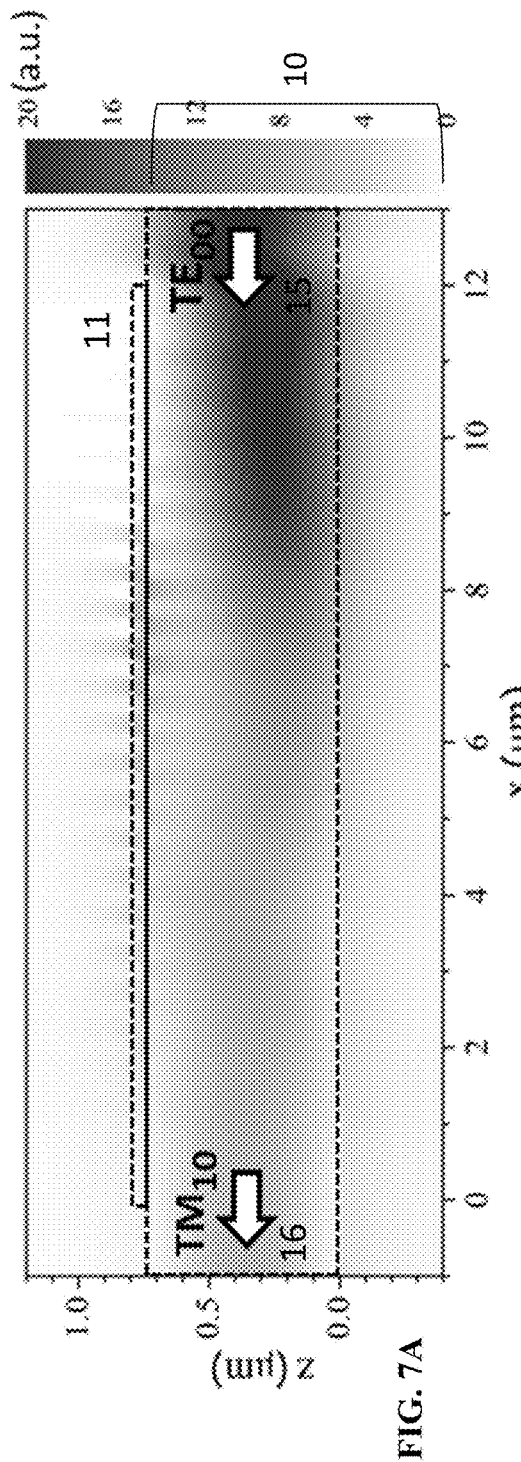
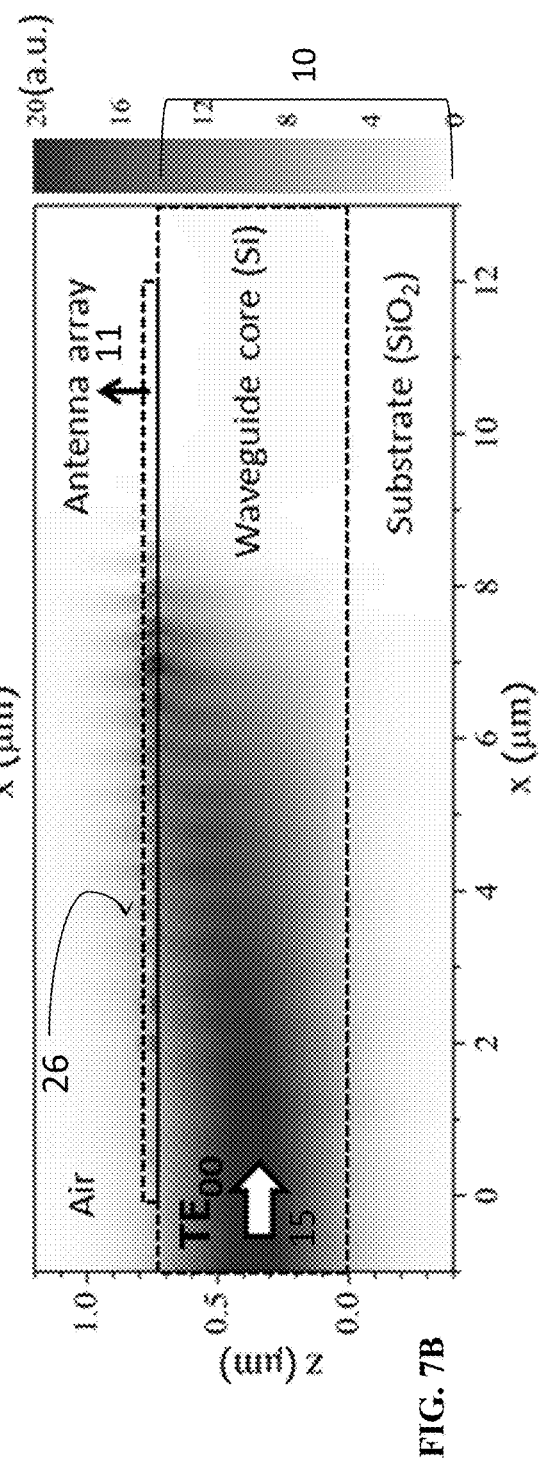
FIG. 7A
FIG. 7B

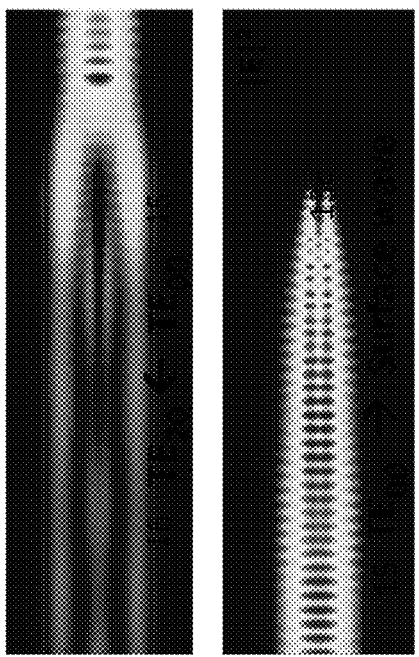
FIG. 9B
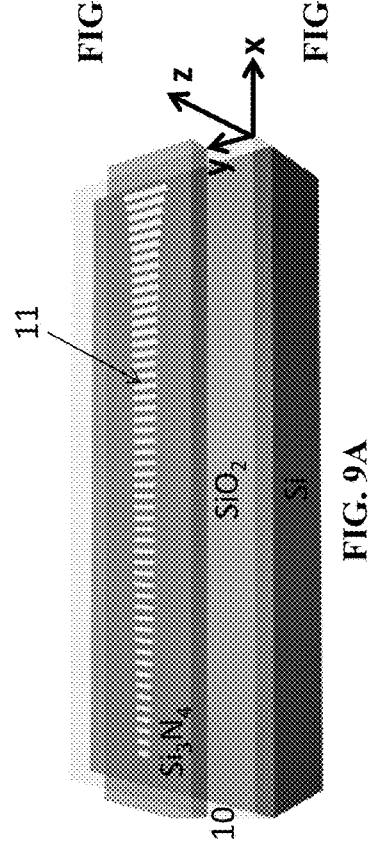
FIG. 9C
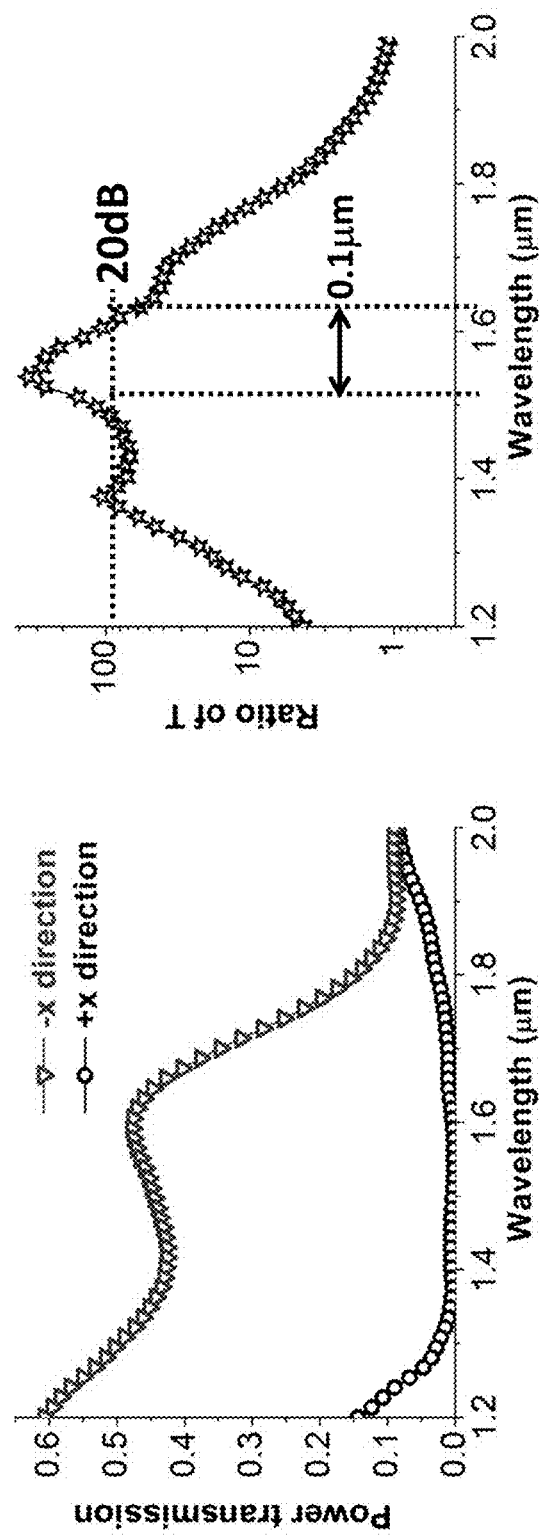
FIG. 9A
FIG. 9D
FIG. 9E

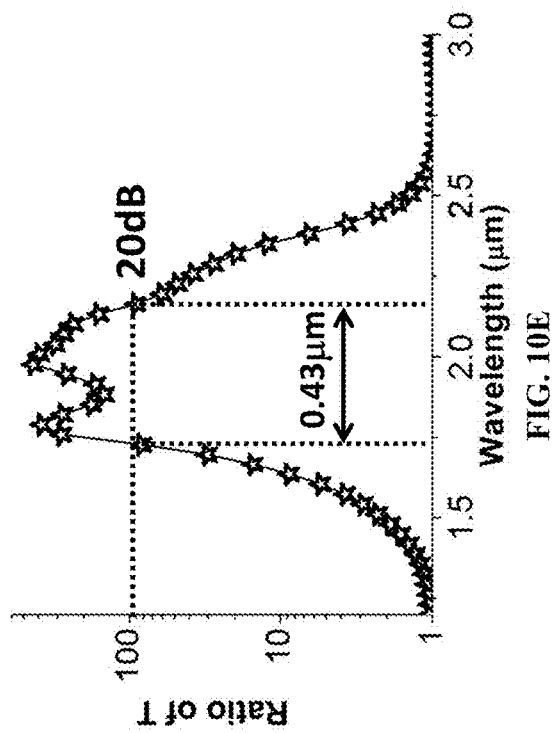
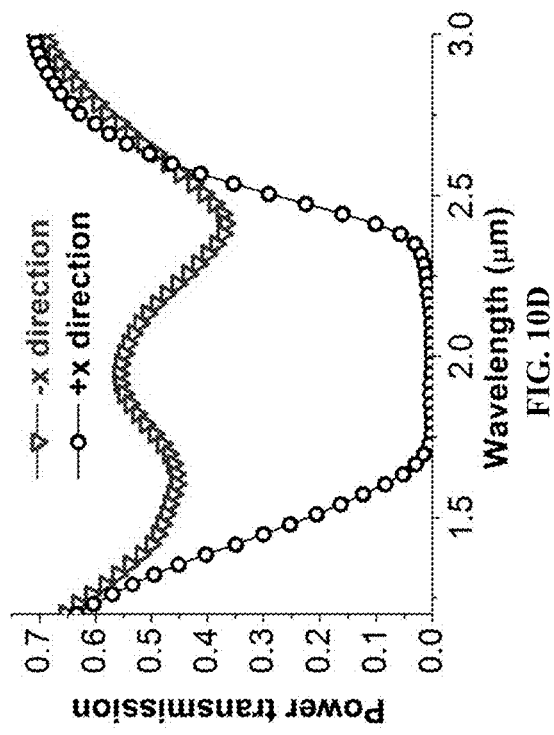
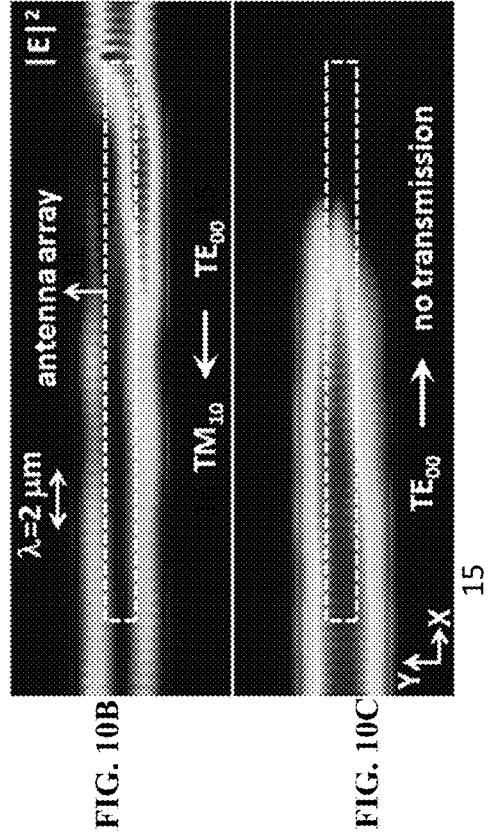
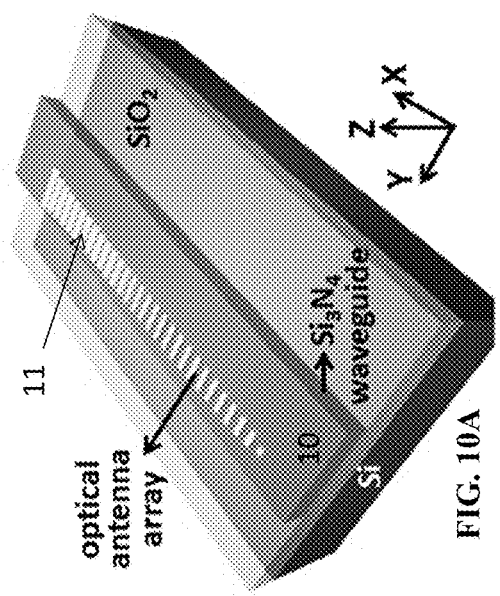
FIG. 10A
FIG. 10B
FIG. 10C
FIG. 10D
FIG. 10E

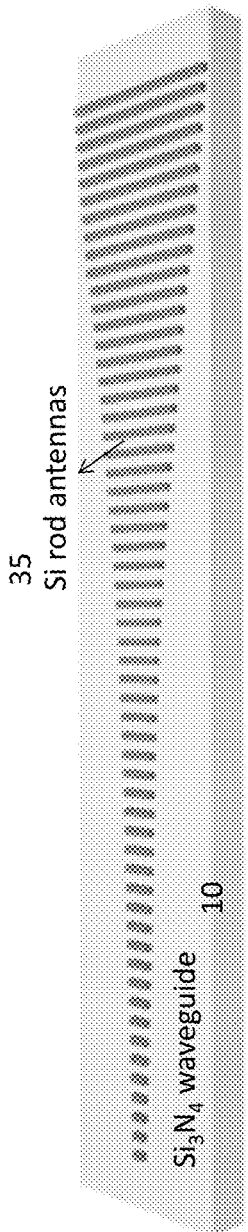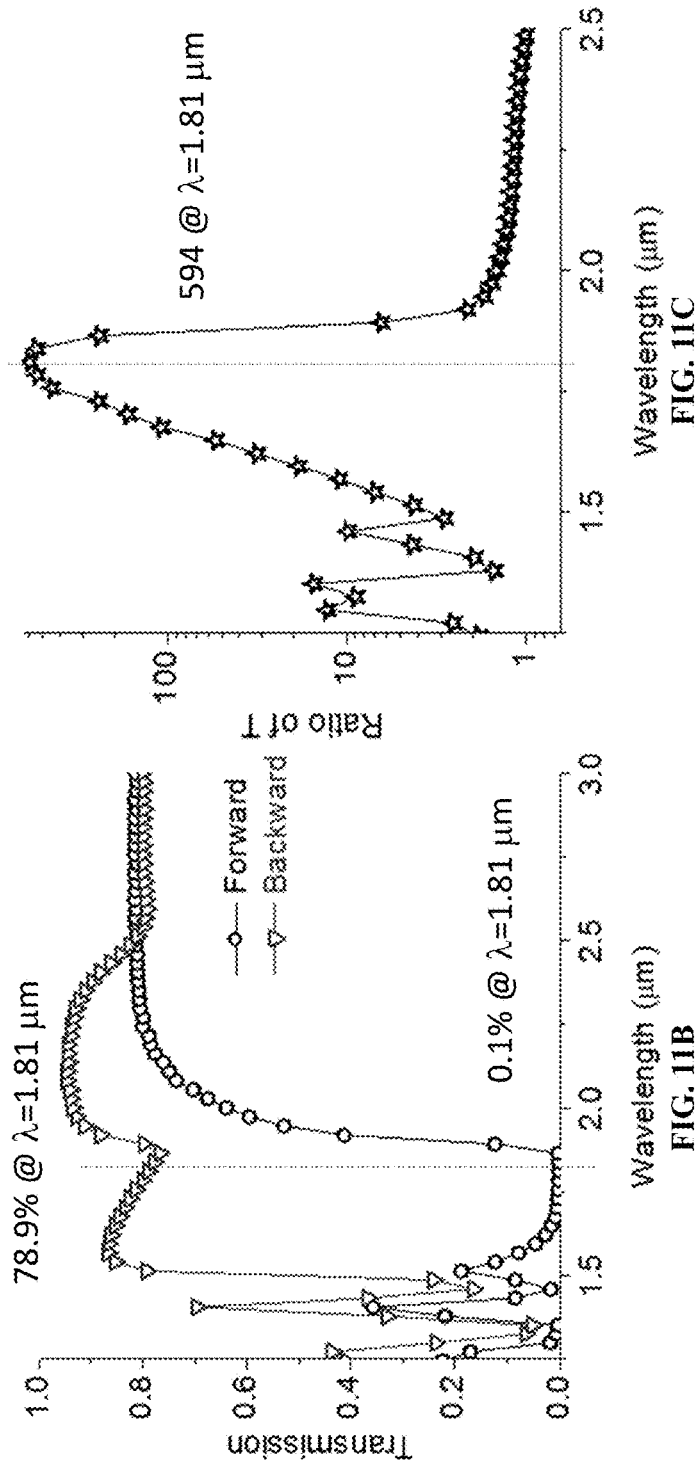
FIG. 11A
FIG. 11B
FIG. 11C

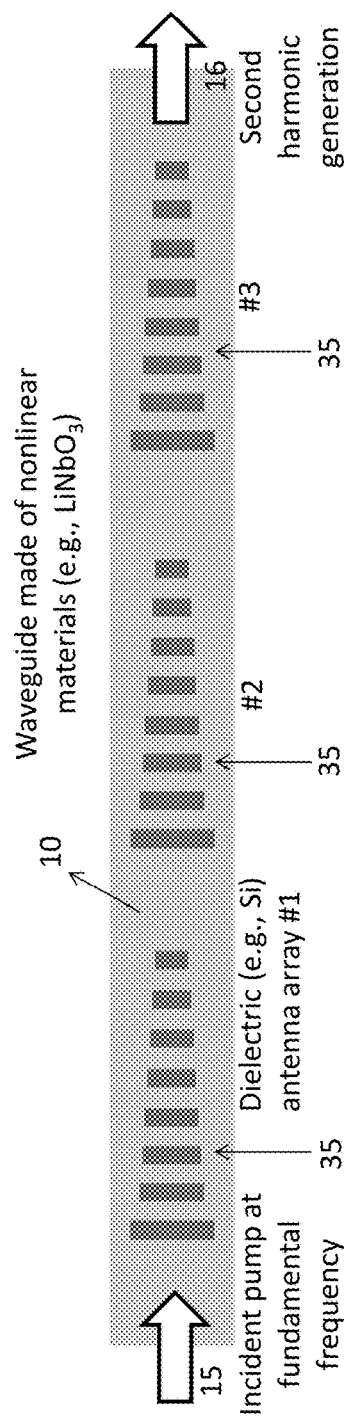
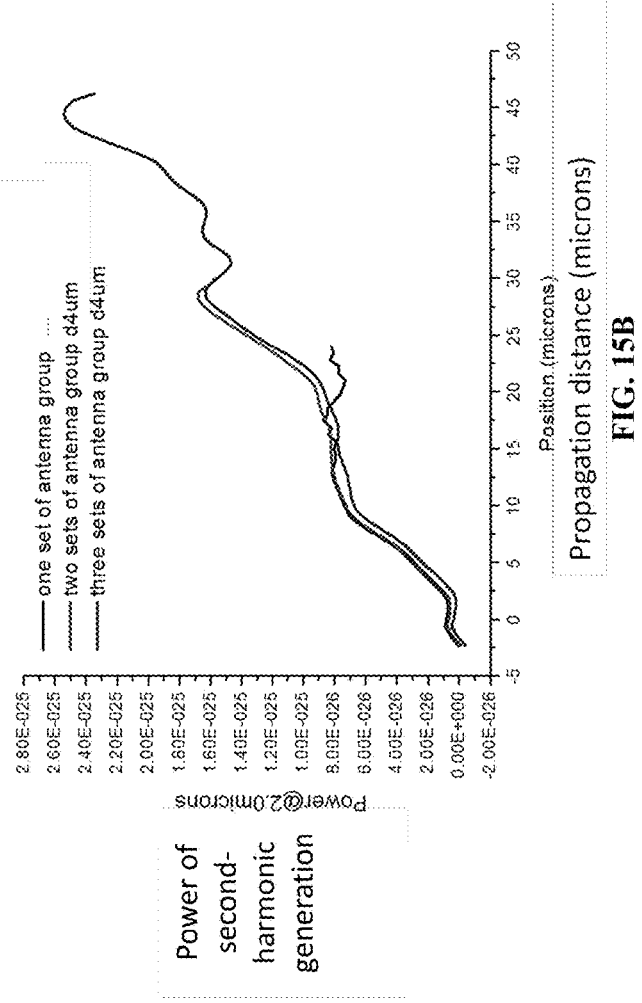
FIG. 15A
FIG. 15B

INTEGRATED PHOTONIC DEVICES BASED ON WAVEGUIDES PATTERNED WITH OPTICAL ANTENNA ARRAYS

CROSS REFERENCE TO RELATED APPLICATIONS

This application is a continuation of International Patent Application No. PCT/US2014/043882 filed on Jun. 24, 2014, and claims priority from provisional application No. 61/839,119 filed Jun. 25, 2013, provisional application No. 61/842,260 filed Jul. 2, 2013, and provisional application No. 61/981,506 filed Apr. 18, 2014, which are incorporated by reference herein.

STATEMENT REGARDING FEDERALLY SPONSORED RESEARCH

This invention was made with government support under contract number ECCS-1307948 awarded by National Science Foundation. The government has certain rights in the invention.

BACKGROUND

The next generation of optical information processing, at the telecommunication wavelength of 1.3-1.6 μm, can be based on an integrated platform. Such a platform can also be important for on-chip chemical/biological sensing, particularly in the mid-infrared spectral range of 2-30 μm. However, certain challenges on the device level can prevent reliable integration on a large scale. These challenges include miniaturizing the device footprint, increasing the operating bandwidth and robustness, and reducing power consumption.

Many integrated photonic devices are based on coupled waveguides, which are typically hundreds of microns to millimeters in length because of the weak coupling between waveguides via evanescent waves. Micro-ring resonators and photonic-crystal cavities can have large quality factors (Q-factors) and enable a great variety of small-footprint photonic devices. A drawback of certain approaches, however, is that the device performance is highly susceptible to interference, such as temperature changes and fabrication errors, and such devices typically have a narrow spectral operating range. Accordingly, there exists a need for a technique to provide lightweight, miniature, and broadband integrated photonics devices.

SUMMARY

Systems and methods for creating integrated photonics devices based on optical waveguides integrated with optical antennas are disclosed herein.

The disclosed subject matter provides integrated photonic devices including an antenna array disposed on an optical waveguide to control the propagation of light through the waveguide. In certain embodiments, the antenna array can be disposed on the top of the waveguide, inside the waveguide, underneath the waveguide, or proximate the side of the waveguide. The antenna array can be fabricated from metallic or dielectric materials.

In certain embodiments, the antenna array includes a plurality of antennas that are spaced equally or unequally. The antennas can have the same or different shapes. The antenna array can have a length no more than one hundred times the free space wavelength and the inter-element spacing between antennas is no more than one free space wavelength.

In certain embodiments, the antenna array can be configured to introduce a spatial distribution of optical phase, such as a linear distribution along the waveguide or a nonlinear distribution along the waveguide. The antenna array can be configured to introduce a spatial distribution of optical amplitude, a spatial distribution of optical polarization, a spatial distribution of optical impedance, or two or more of spatial distributions of phase, amplitude, polarization, and optical impedance.

In certain embodiments, the integrated photonic device can be configured to form an optical waveguide mode converter. The mode converter can be adapted for use in a mode-division multiplexing or demultiplexing system. The integrated photonic device can also be configured to form a polarization rotator. The polarization rotator can be adapted for use in a polarization-division multiplexing or demultiplexing system.

The disclosed subject matter provides a device including a plurality of the integrated photonic devices configured to form an optical waveguide mode converter and a polarization rotator adapted for use in a hybrid mode- and polarization-division multiplexing or demultiplexing system.

In certain embodiments, the integrated photonic device can be configured to form an absorber of optical power, an optical power diode, or a nanoscale hot spot of light for heat-assisted magnetic recording. The integrated photonic device can alternatively be configured to form a small-footprint photodetector, where the waveguide is a semiconductor and the antenna array a plurality of aperture antennas defined in a metallic film.

The integrated photonic device can also be configured to form a nonlinear optical element, where the waveguide is made of one or more optical nonlinear materials and the antenna array is configured for phase matching between different waves adapted for participating in the nonlinear optical process. The integrated photonic device can be configured as an optical isolator. The integrated photonic device can be further configured for routing an optical signal to a predetermined optical waveguide at a junction of waveguides.

The antenna array can include a two-dimensional array, and the waveguide a two-dimensional slab waveguide. In certain embodiments, the antenna array can include metallic or dielectric materials, the waveguide a near-infrared transparent material, and the device is adapted for electromagnetic waves having telecommunications wavelengths from 1.3 to 1.6 μm. The device can also be adapted for the visible, mid-infrared, far-infrared, microwave, and radio wavelength range by using proper metallic and dielectric materials as disclosed herein.

The accompanying drawings, which are incorporated and constitute part of this disclosure, illustrate embodiments of the disclosed subject matter.

BRIEF DESCRIPTION OF THE DRAWINGS

FIG. 3A shows the schematic of a $TE_{00}$-to-$TM_{10}$ waveguide mode converter. FIG. 3B shows the simulated electric field polarized along the Y axis. FIG. 3C shows the simulated electric field polarized along the Z-axis. The black dashed frames denote the location of the antenna array.

FIGS. 5A-5D show several waveguide mode converters designed for the telecommunications wavelength $\lambda$=1.55 μm.

FIG. 6(a) shows that in the right-to-left direction the incident $TE_{00}$ mode is converted into $TM_{10}$ mode.

FIGS. 7A-7B show unidirectional optical power flow as a result of the directional mode conversion in the device illustrated in FIG. 3A. Plotted is the spatial distribution of the magnitude of the Poynting vector (defined as the cross product of electric field and magnetic field). FIG. 7A shows that light propagation in the right-to-left direction is not blocked because of mode conversion. FIG. 7B shows that light propagation in the left-to-right direction is completely absorbed by the phased antenna array.

FIGS. 9A-9E show unidirectional optical power flow in an optical power diode device designed for the telecommunications wavelength around 1.55 μm.

FIGS. 10A-10E show unidirectional optical power flow in an optical power diode device designed for a mid-infrared wavelength around 2 μm.

FIGS. 11A-11C show a mode converter/optical power diode based on dielectric phased-array antennas. The energy efficiency of mode conversion is much higher than the efficiency of devices based on metal plasmonic phased-array antennas.

FIGS. 15A-15B show a highly efficient, broadband integrated nonlinear optical device for second-harmonic generation based on dielectric phased-array antennas patterned on a waveguide made of nonlinear optical materials.

FIG. 17A shows a schematic of the device, which consists of a two-dimensional phased antenna array patterned on a slab optical waveguide and covered by a thin film of vanadium dioxide. FIG. 17B shows the angular distributions of optical power in the slab waveguide when the vanadium dioxide film is switched between a dielectric state and a metallic state. FIG. 17C is the top view of the device showing that the optical beam steers upwards. FIG. 17D is the top view of the device showing that the beam goes straight along the X-axis.

Figure 1B:
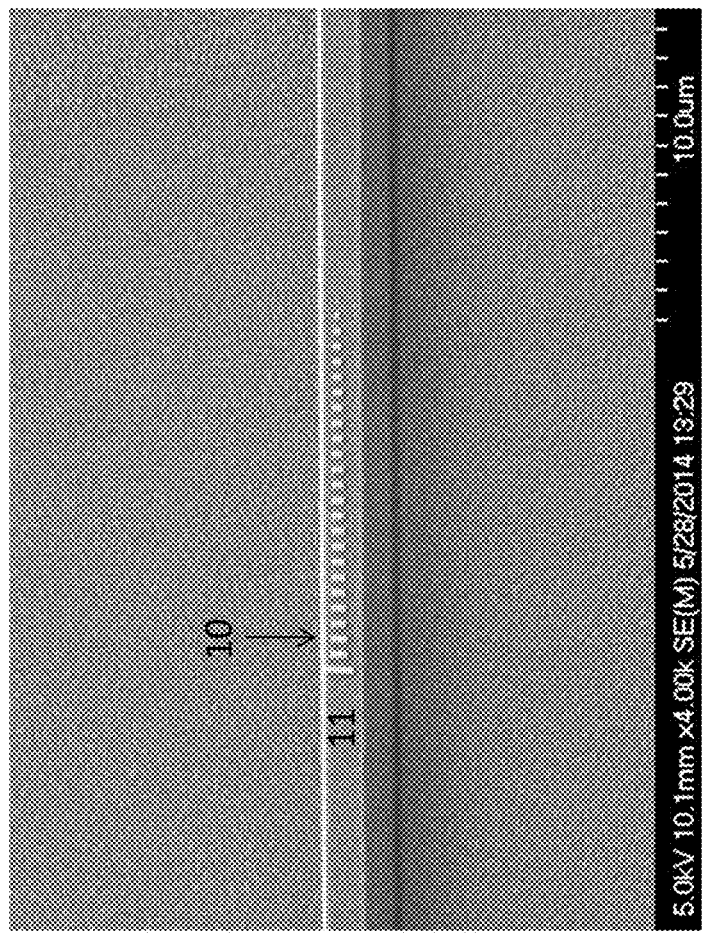
FIG. 1B shows an image taken by a scanning electron microscope of a gold plasmonic antenna array on a silicon waveguide.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

An array of optical antennas 11 (i.e., small objects that scatter light waves) patterned in the vicinity of an optical waveguide 10 can control light propagation in the waveguide. The optical antennas can be made from metallic materials or dielectric materials. Metallic materials are materials with negative real parts of the electric permittivity, including metals such as gold, silver, copper, aluminum, platinum, etc., heavily doped semiconductors, transparent conductive oxides, transition-metal nitrides. Dielectric materials are materials with positive real parts of the electric permittivity, including silicon, germanium, high-k dielectric materials, glasses, plastics, and nonconductive crystals. The antenna array 11 and the optical waveguide 10 can be fabricated using conventional CMOS (complementary metal-oxide-semiconductor)-compatible techniques. The optical waveguides 10 integrated with optical antennas 11 disclosed herein can be used to build a wide range of integrated photonic devices including waveguide mode converters, integrated polarization rotators, integrated perfect absorbers of optical power, optical power diodes, on-chip nonlinear optical devices, optical isolators, and optical circulators. Waveguide mode converters couple an incident waveguide mode into another waveguide mode of a different order. They can realize mode conversion between the fundamental waveguide mode and a higher-order waveguide mode, or between high-order waveguide modes of different orders. Integrated polarization rotators couple an incident TE waveguide mode into an outgoing TM waveguide mode, or vice versa. Integrated perfect absorbers completely absorb an incident waveguide mode, for example, by converting the mode into a surface wave propagating along the metallic phased antenna arrays and dissipating optical power via Joule heating. Optical power diodes allow light to propagate only along one direction through a waveguide during which the waveguide mode is converted or its polarization is rotated. In the opposite direction, optical power diodes absorb the waveguide mode and therefore block light completely. On-chip nonlinear optical devices use phased optical antenna arrays to help phase matching between different waves and thereby realize efficient optical nonlinear processes (e.g., second/third harmonic generation, sum/difference frequency generation, four-wave mixing, and parametric down conversion) in optical waveguides. Optical circulators are optoelectronic devices that can route an optical signal to a specific optical waveguide at a junction of multiple waveguides. Optical isolators permit a mode to propagate through the waveguide in one direction (the order and the polarization of the mode is not changed), but the mode will be strongly reflected or absorbed in the opposite direction. Isolators are useful optoelectronic components that can permit emission from a laser to enter an optical communication network, but can simultaneously blocks reflection from the network back towards the laser, which can disturb the operation of the laser.

Figure 1A:
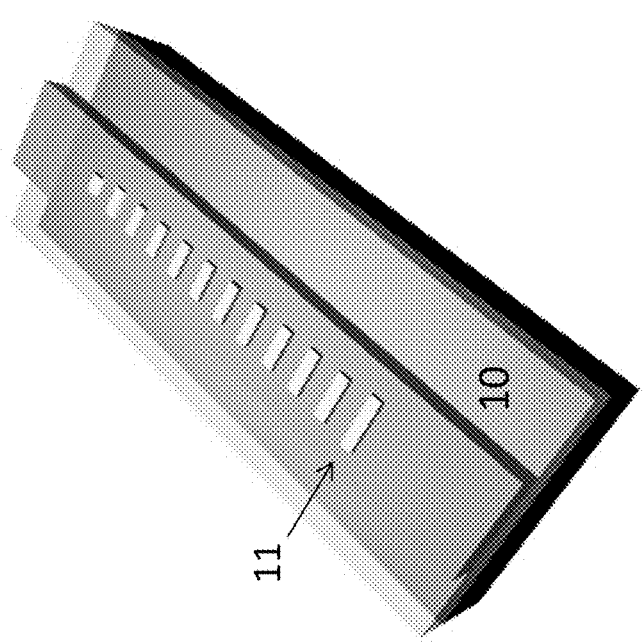
FIG. 1A shows a schematic of the metal plasmonic antenna array on a dielectric waveguide.

FIG. 1A is a schematic of an exemplary metal plasmonic antenna array 11 on a dielectric waveguide 10 in accordance with the disclosed subject matter. The phased antenna array 11 includes antennas with different sizes. In the particular example shown in FIG. 1A, they have different lengths but fixed width and thickness. The phase difference $d\Phi/dx$ between adjacent antennas can be identical, forming a constant phase gradient $d\Phi/dx$ along the antenna array. The phase difference $d\Phi$ does not necessarily need to be constant and the phase gradient can be designed for specific applications. FIG. 1B shows a scanning electron microscope image of the fabricated device, which consists of gold plasmonic antennas sitting on a silicon waveguide.

Figure 2A:
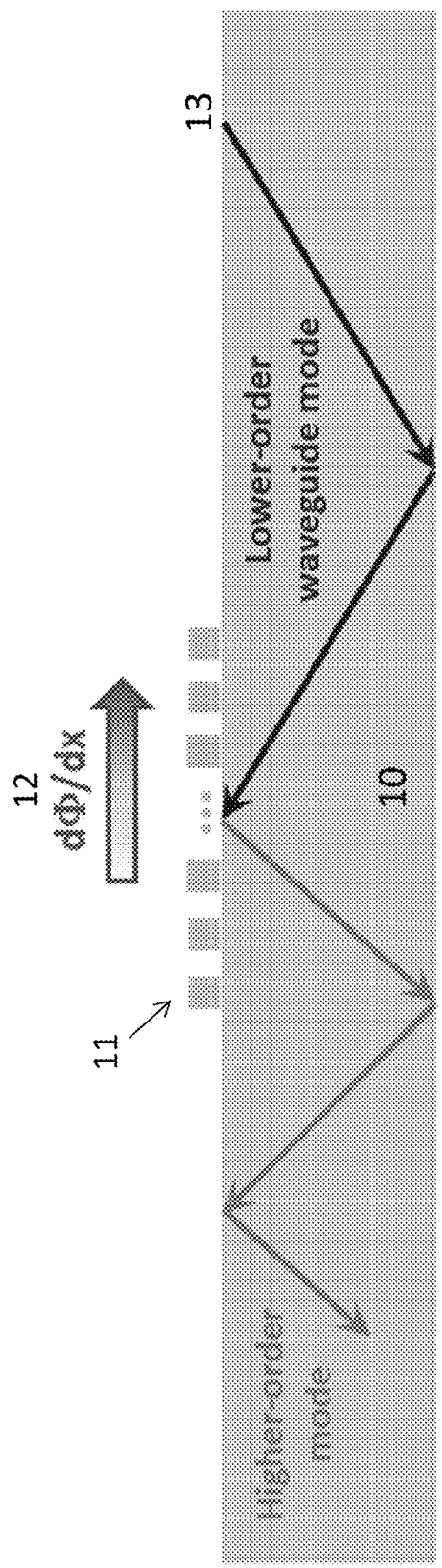
FIG. 2A illustrates mode conversion assisted by the phased antenna array when light propagates in the right-to-left direction.
Figure 2B:
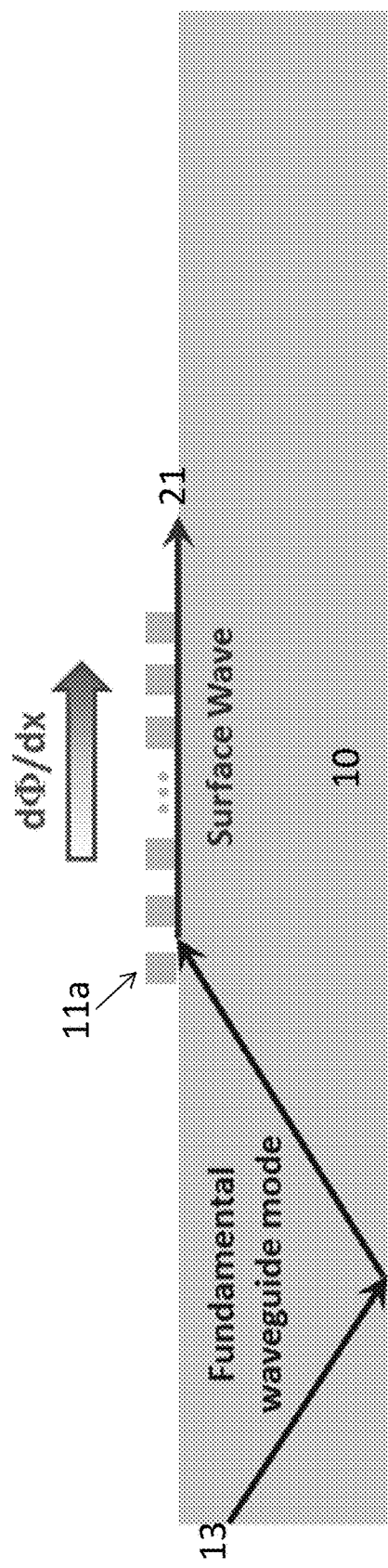
FIG. 2B illustrates that the phased antenna array converts the incident waveguide mode into a surface wave in the left-to-right direction and that the surface wave gets absorbed entirely by the antenna array.

FIGS. 2A-2B is a schematic illustrating the operation of the device of FIG. 1A when light 13 propagates in two opposite directions along the waveguide 10. FIG. 2A shows mode conversion when light propagates in the right-to-left direction. FIG. 2B illustrates that the device converts incident light 13 into a surface wave 21 in the left-to-right direction.

FIGS. 3A-3C show an exemplary waveguide mode converter device 14 in accordance with the disclosed subject matter. It converts the $TE_{oo}$ mode 15 to the TM 10 mode 16. During the mode converter process, the mode order is elevated by one and the polarization of the mode is rotated from TE (i.e., transverse electric) to TM (i.e., transverse magnetic). The device 14 can be used over the mid-infrared wavelength range from about $\lambda=3.5$ μm to 5 μm. FIG. 3A shows a schematic of the $TE_{00}$ 15 to $TM_{10}$ mode 16 converter. The gold phased optical antenna array 11 is patterned on the top of a silicon waveguide 10 and has a total length of 12 μm, only a few times of the free-space wavelength 4 μm. The calculated $E_y$ and $E_z$ components obtained by full-wave simulations are shown in FIG. 3B and FIG. 3C respectively, which together illustrate a cross-sectional view of field patterns inside the device when the light propagates in the backward direction. The dashed lines denote the location of the antenna array 11. $E_y$ 17 is the electric field polarized along the Y-axis, as shown in FIG. 3B. FIG. 3C shows the $E_z$ 18 component of the electric field, which is normal to the plane of the waveguide 10.

Figure 4:
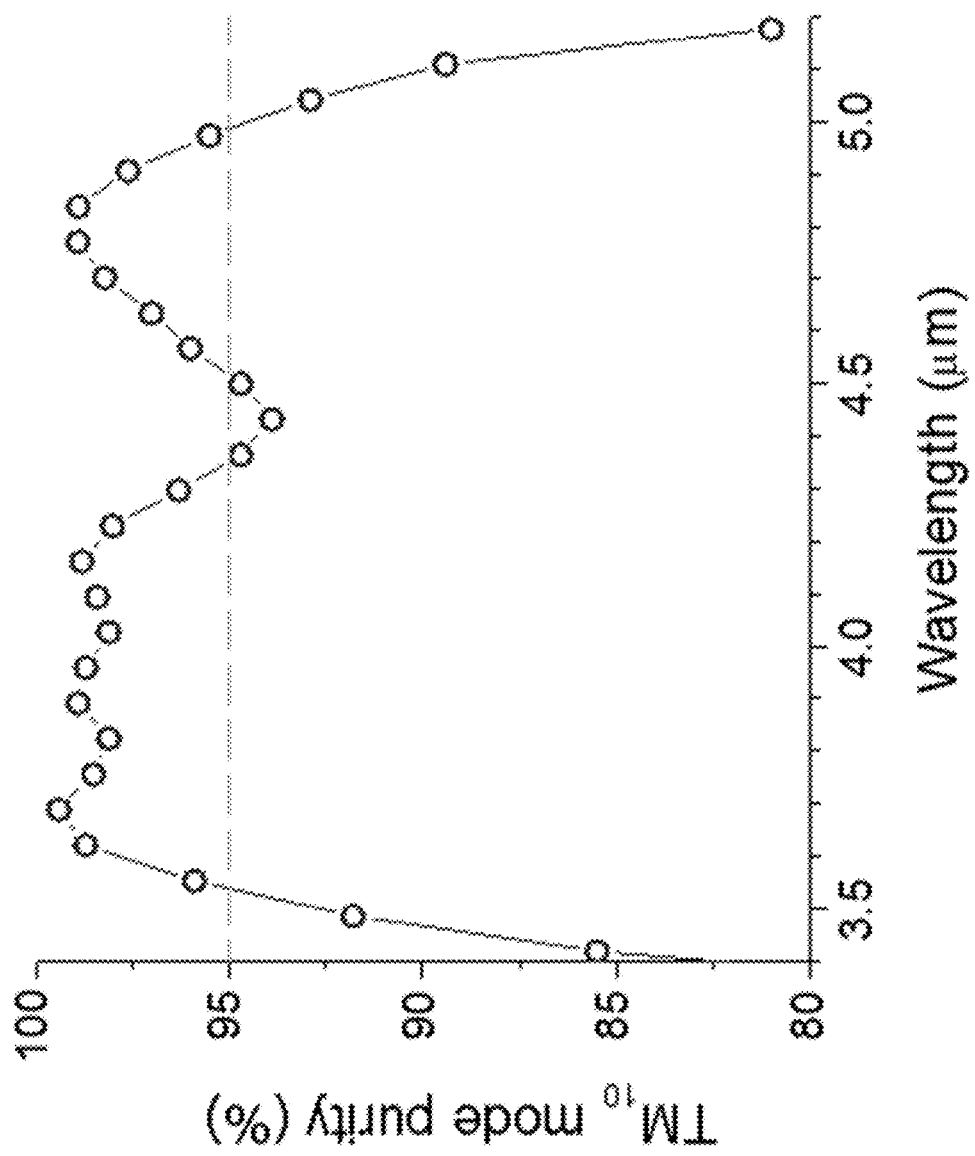
FIG. 4 shows that the purity of the converted $TM_{10}$ mode is maintained at a high level across a wide wavelength range.

FIG. 4 shows the broadband operation of the mode converter 14. The purity of the converted $TM_{10}$ mode 16 is maintained at a high level of greater than 95% over an ultra-broad wavelength range of 3.5-5.0 μm.

Figures 5A, 5B, 5C, 5D:
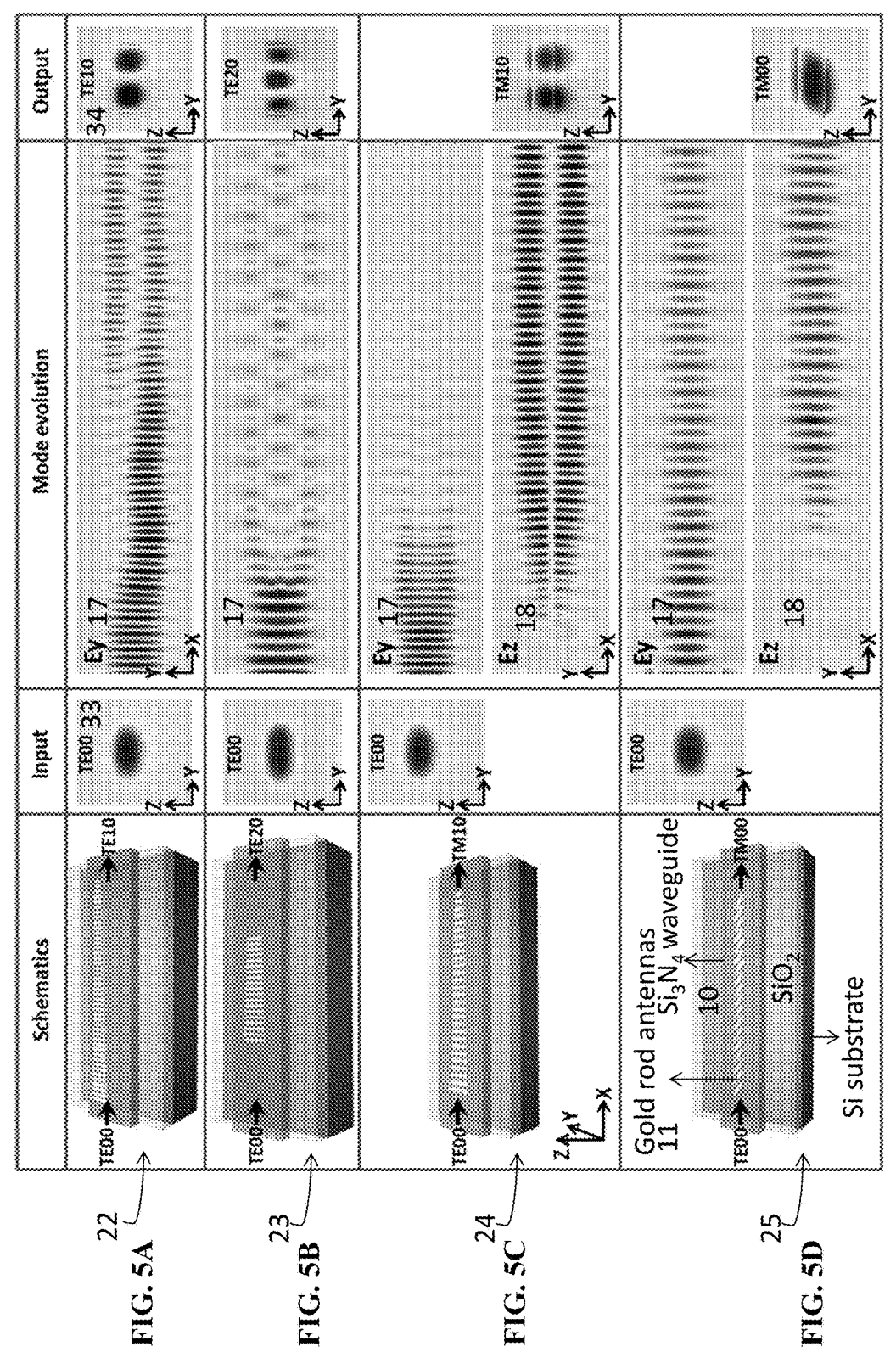

FIGS. 5 A-5D show four exemplary waveguide mode convertors 14 at the telecommunications wavelength of 1.55 μm. The leftmost "Schematics" column shows schematics of the devices. The "Input" column shows the input mode on the left side of the converter. The "Mode evolution" column is a cross-sectional view of field patterns in the devices when light propagates in the forward direction. The "Output" column shows the optical mode exiting the waveguide from the right side of the converter. In FIG. 5A the $TE_{00}$ to $TE_{10}$ mode converter elevates the mode order by one. The $Si_3N_4$ waveguide's 10 dimension is 2.3 μm in width and 0.45 μm in height. There are 19 nano-antennas with a width of 50 nm and a spacing of 300 mn centered on the top of the waveguide 10. The phase difference $d\Phi$ between neighboring antennas is 3.5 degrees. The mode conversion is seen from the evolution of $E_y$ field when light travels through the antenna arrays 11. The $TE_{00}$ fundamental mode with a single lobe in the $E_y$ component 17 changes gradually to the higher-order mode $TE_{10}$, which has two lobes with opposite signs in the $E_y$ component 17. The total power transmission is 30% and the purity of the converted $TE_{10}$ mode is 88%. In FIG. 5B, the $TE_{00}$ to $TE_{20}$ mode converter elevates the mode order by two. In FIG. 5C the $TE_{00}$ to $TM_{10}$ mode converter elevates the mode order by one and flips the polarization from TE to TM. In FIG. 5D the $TE_{00}$ to $TM_{00}$ mode converter only flips the polarization without elevating the order of the waveguide mode.

All waveguide mode converters are just a few to ten times of the free-space wavelength in length. In almost all cases, the purity of the converted mode is significant (>85%) over a broad wavelength range (>1 μm). The only exception is the last example, in the $TE_{00}$ to $TM_{oo}$ mode converter, where the purity of the converted mode is only about 50%. The design can be further optimized so that the purity of the converted $TM_{00}$ mode is above 95% and the energy efficiency of the conversion process is above 95% using dielectric instead of metallic antenna arrays. Note that the mode conversion process is reciprocal. For example, in the first device shown in FIG. 5A if the $TE_{10}$ mode is launched into the waveguide from the right port, it will be converted into the $TE_{00}$ fundamental mode with high purity exiting from the left port. Previous work on integrated TE-to-TM polarization rotators are based on various forms of birefringent waveguides that have asymmetric cross-sections. Such waveguides are difficult to fabricate and have a narrow operating bandwidth. Devices according to the disclosed subject matter can be created by planar fabrication techniques and can maintain optimal performance over an ultra-broad spectral range.

Figures 6A, 6B:
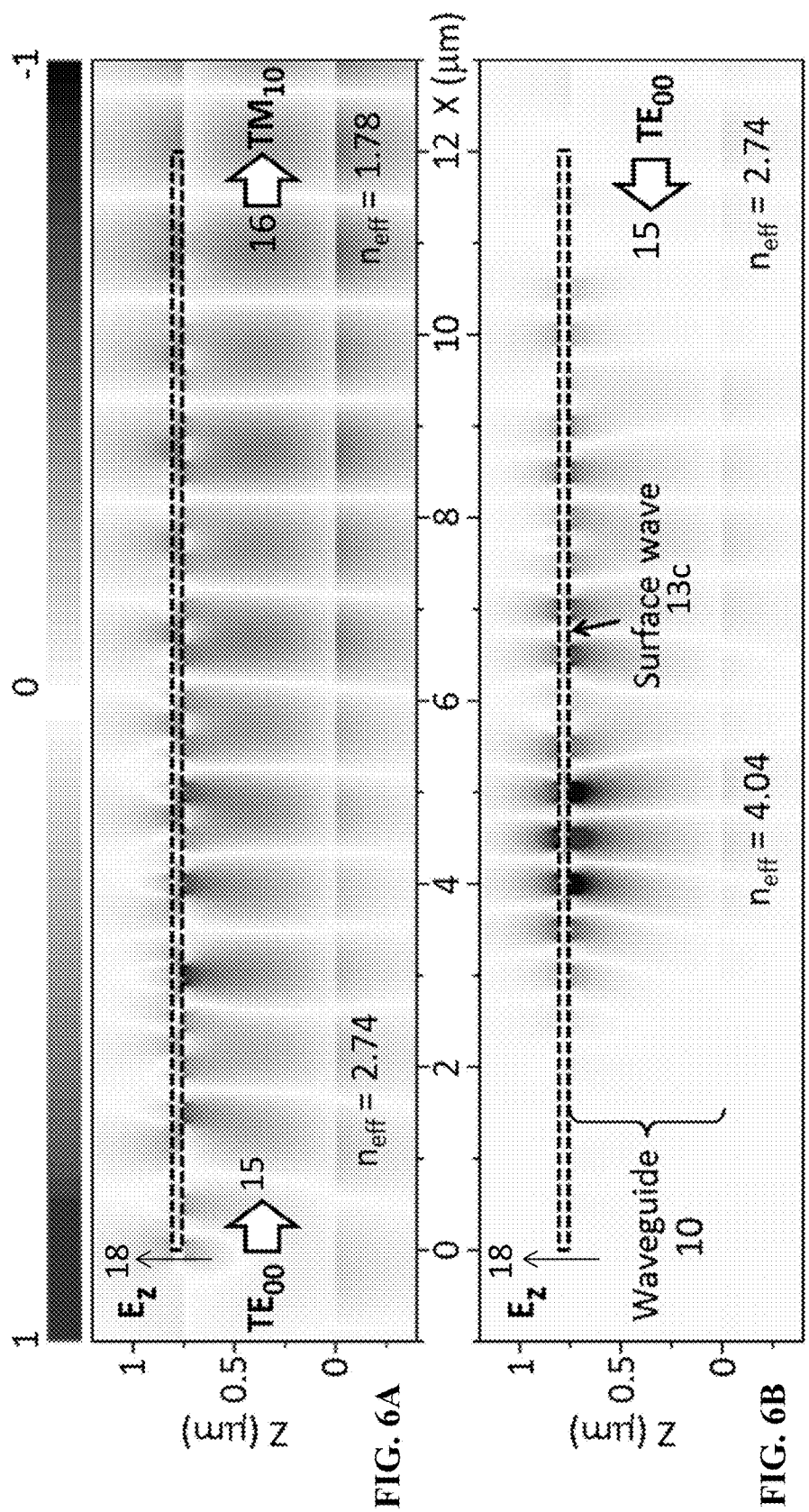
FIG. 6A shows directional mode conversion in the device illustrated in FIG. 3(a).
FIG. 6B shows that in the left-to-right direction the incident $TE_{00}$ mode is converted into a surface wave propagating along the antenna layer (denoted by the dashed frame) and that the surface wave is eventually totally absorbed by the antennas.

FIGS. 6A-6B shows directional mode conversion in the device shown in FIG. 3 at $\lambda=4$ μm. FIG. 6A represents a full wave simulation showing that the $TE_{00}$ incident mode 15 is converted into the $TM_{10}$ mode 16 in the backward direction. In FIG. 6B, light is converted into a surface wave propagating along the antenna array 11 in the forward direction, and the surface wave gets completely absorbed by the metallic antenna array 11. FIG. 6B shows that the surface wave is localized around the antennas, a property that can be used for building perfect absorbers and small-footprint photodetectors for integrated photonic circuits. The dashed lines in FIGS. 6A and 6B denote the location of the antenna array.

FIGS. 7A-7B show unidirectional optical power flow in the optical power diode at an operating wavelength of κ=4 μm. The power transmission efficiency in the backward direction is about 40% from $\lambda=3.5$ μm to $\lambda=4.5$ μm due to mode conversion from $TE_{00}$ to $TM_{10}$ The remaining 60% of the optical power is primarily absorbed by the antenna array. In the forward direction, the incident optical power flow bends upwards and terminates at the antenna layer on the top surface of the waveguide. The power transmission is only about 0.4% at $\lambda=4$ μm. About 95% of the power is absorbed by the antenna array and there is very limited reflection back into the input port and very limited optical scattering into free space and the substrate.

Figures 8A, 8B:
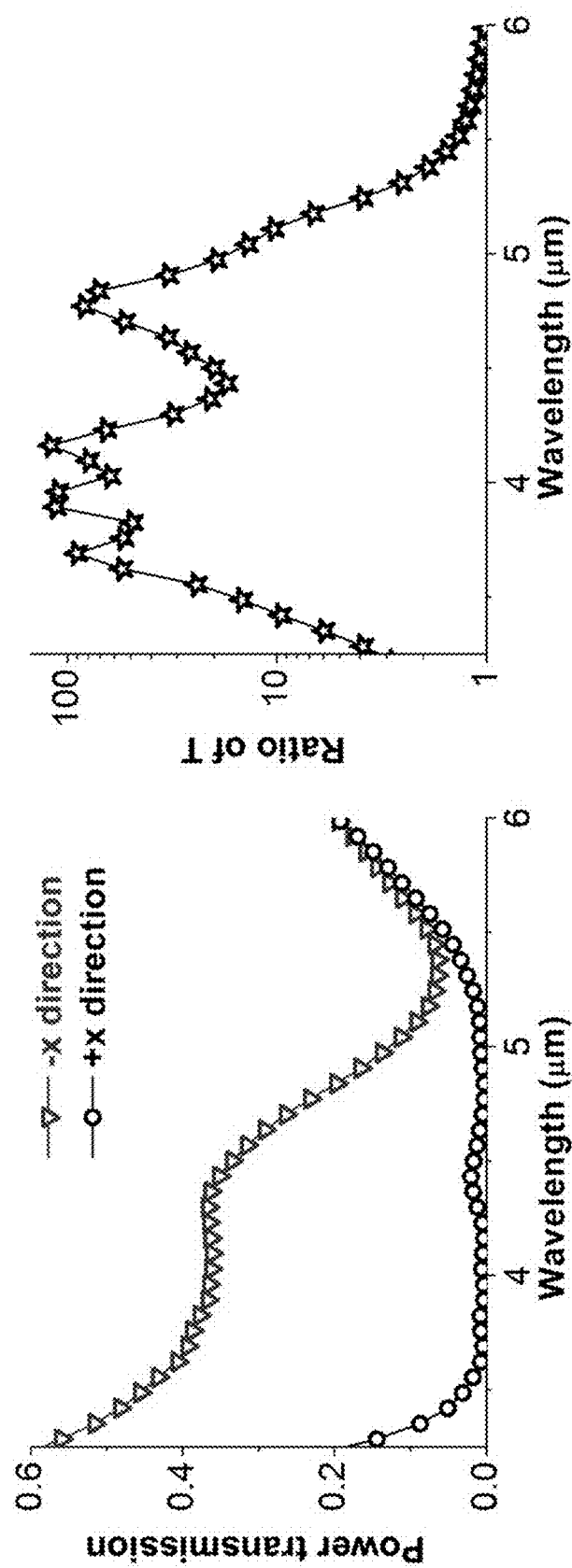
FIGS. 8A-8B show the transmission spectra in the forward and backward directions in the device illustrated in FIG. 3A, and the ratio between the two transmission spectra.

FIGS. 8A-8B show the transmission spectra in the forward and backward directions, and the ratio between the two transmission spectra, calculated based on the simulation results in FIG. 7. In FIG. 8A, the power transmission approaches 40% in the backward direction around λ=4 μm but is only about 0.4% in the forward direction at λ=4 μm. In FIG. 8B, the suppression ratio approaches 100 at λ=4 μm and is maintained at a high level over a wide wavelength range.

FIGS. 9A-9E show unidirectional optical power flow in an exemplary optical power diode designed to operate around the telecommunications wavelength of 1.55 μm. The device consists of a gold plasmonic antenna array 11 on a $Si_3N_4$ waveguide 10 shown in FIG. 9A. In the backward direction, FIG. 9B, the $TE_{00}$ fundamental mode 15 couples into the $TE_{20}$ mode 16. In the forward direction, FIG. 9C the device couples the incident $TE_{00}$ mode into a surface wave 21. The device's power transmission spectra in the forward and backward direction are shown in FIG. 9D. FIG. 9E shows that the operation bandwidth of the device is about 0.1 μm with a suppression ratio of power transmission better than 20 dB.

FIGS. 10A-10E show unidirectional optical power flow in an exemplary optical power diode designed to operate around k=2 μm. The device consists of a gold plasmonic antenna array 11 on a $Si_3N_4$ waveguide 10 shown in FIG. 10A. In the backward direction, FIG. 10B, the $TE_{00}$ fundamental mode 15 couples into the $TM_{10}$ mode 16. In the forward direction, FIG. 10C, the device couples the incident $TE_{00}$ mode into a surface wave 21. The device's power transmission spectra in the forward and backward direction are shown in FIG. 10D. FIG. 10E shows that the operation bandwidth of the device is about 0.4 μm with a suppression ratio of power transmission better than 20 dB.

FIGS. 11A-11C show a mode converter/optical power diode based on dielectric phased-array antennas 35. FIG. 11A is a schematic of a device consisting of a dielectric (e.g., Si) antenna array 35 patterned on a $Si_3N_4$ waveguide 10 designed for the telecommunications wavelength. The device's power transmission spectra in the forward and backward direction are shown in FIG. 11B. FIG. 11C shows that the device operating as an optical power diode has a maximum suppression ratio of power transmission approaching 600 at λ=1.81 μm.

The unidirectional power flow demonstrated in disclosed optical power diodes is different from optical isolation. An optical isolator allows the transmission of light in only one direction through a waveguide but does not change the order or the polarization of the waveguide mode. However, the transmission of optical power through the disclosed optical power diodes is based on mode conversion. Optical isolation can only be realized in systems with non-reciprocity (e.g., systems with magnetic fields, nonlinearity, or temporal refractive index modulations). The disclosed optical power diodes, however, are strictly reciprocal. The optical power diode is therefore not as powerful as the optical isolator (optical isolators are discussed below), but nevertheless has useful applications. For example, it can allow an integrated laser (called the master laser) to inject its output into a second on-chip laser for laser mode-locking, but prevents the output of the second laser from feeding back into the master laser. Directional mode conversion and optical power diode effects have been previously studied theoretically and experimentally in photonic crystal systems. The drawback of those systems is that the operating bandwidth is quite narrow because photonic crystals are highly dispersive.

Figure 12:
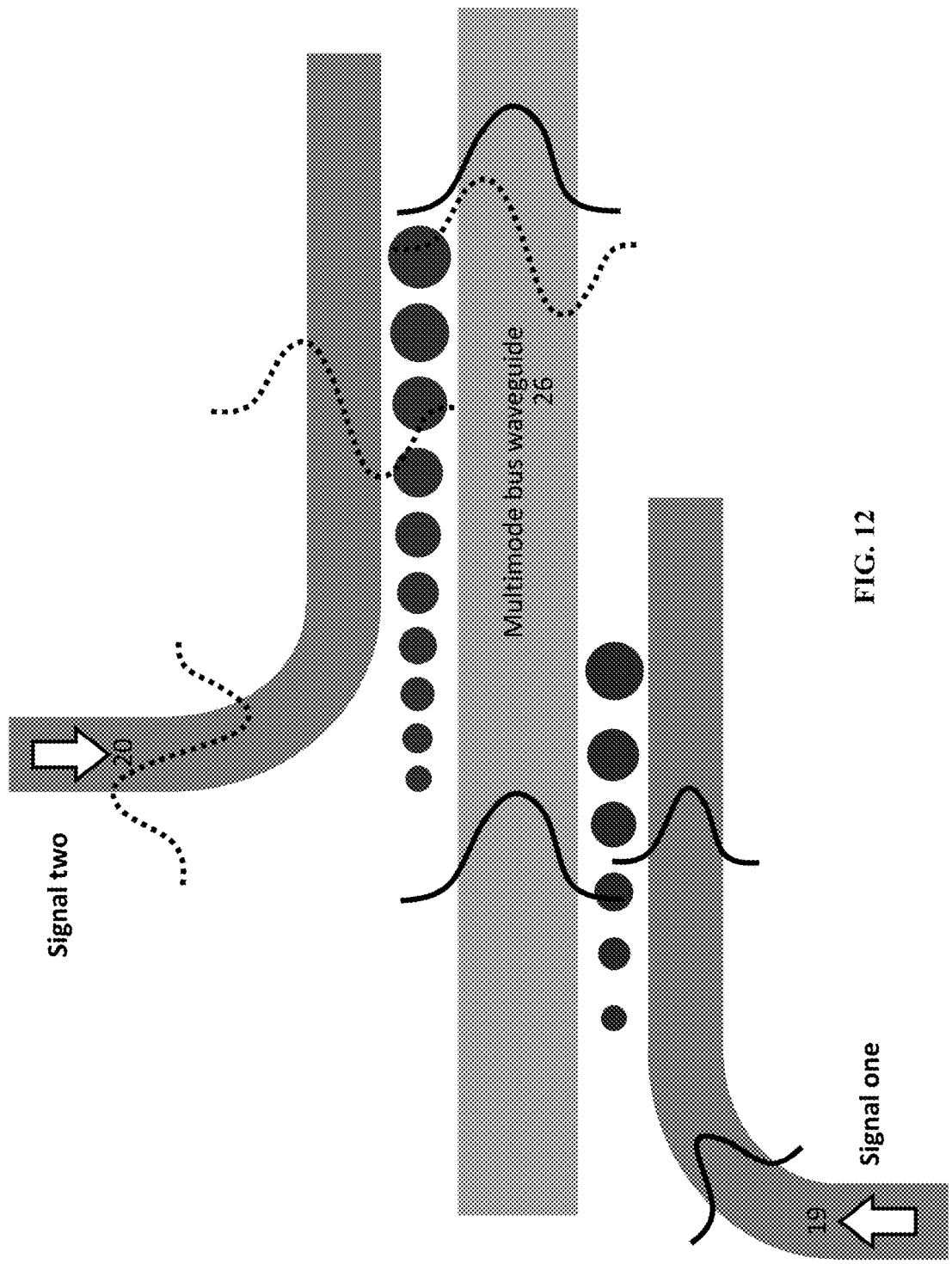
FIG. 12 shows a schematic of mode-division multiplexing based on phased antenna arrays patterned on the side of the waveguides. The antenna arrays are represented as arrays of discs with different sizes. Two signals of the same frequency carried by different waveguide modes are merged into the bus waveguide by the phased antenna arrays. Mode-division demultiplexing can be realized by using the same device but with light propagating in the right-to-left direction, and shows a schematic of mode-division multiplexing based on phased antenna arrays patterned on the top of the waveguides.

FIG. 12 shows a schematic of mode-division multiplexing/demultiplexing (MDM/D) based on phased antenna arrays patterned on the side of optical waveguides, and shows a schematic of MDM/D based on phased antenna arrays patterned on the top of optical waveguides. Waveguide mode conversion has applications in mode-division multiplexing/demultiplexing and polarization-division multiplexing/demultiplexing (PDM/D). The techniques of MDM/D and PDM/D allow for increasing the capacity of the communication channel by using waveguide modes of different orders or different polarizations to carry different pieces of information. For example, waveguide modes of the same optical frequency but of different orders can share the same optical waveguide and carry different channels of information without interference between them. In the multiplexing process the phased optical antenna arrays 11 can be used to merge waveguide modes with different orders or with different polarizations into a bus waveguide 26, which bridges the signal transmitter and receiver. In the demultiplexing process, the phased optical antenna arrays 11 can help couple waveguide modes with different orders or with different polarizations into different waveguides so that information can be decoded from each individual mode.

In FIG. 12, Signal One 19 and Signal Two 20 are carried by different waveguide modes. Two channels of information carried by two different waveguide modes with the same carrier frequency are multiplexed into the bus optical waveguide 26 for long-distance transmission by phased antenna arrays (shown as arrays of discs with varying sizes but can have other designs) 11. At the receiving end, similar phased antenna arrays will separate or demultiplex different channels of information into different waveguides.

Figure 13:
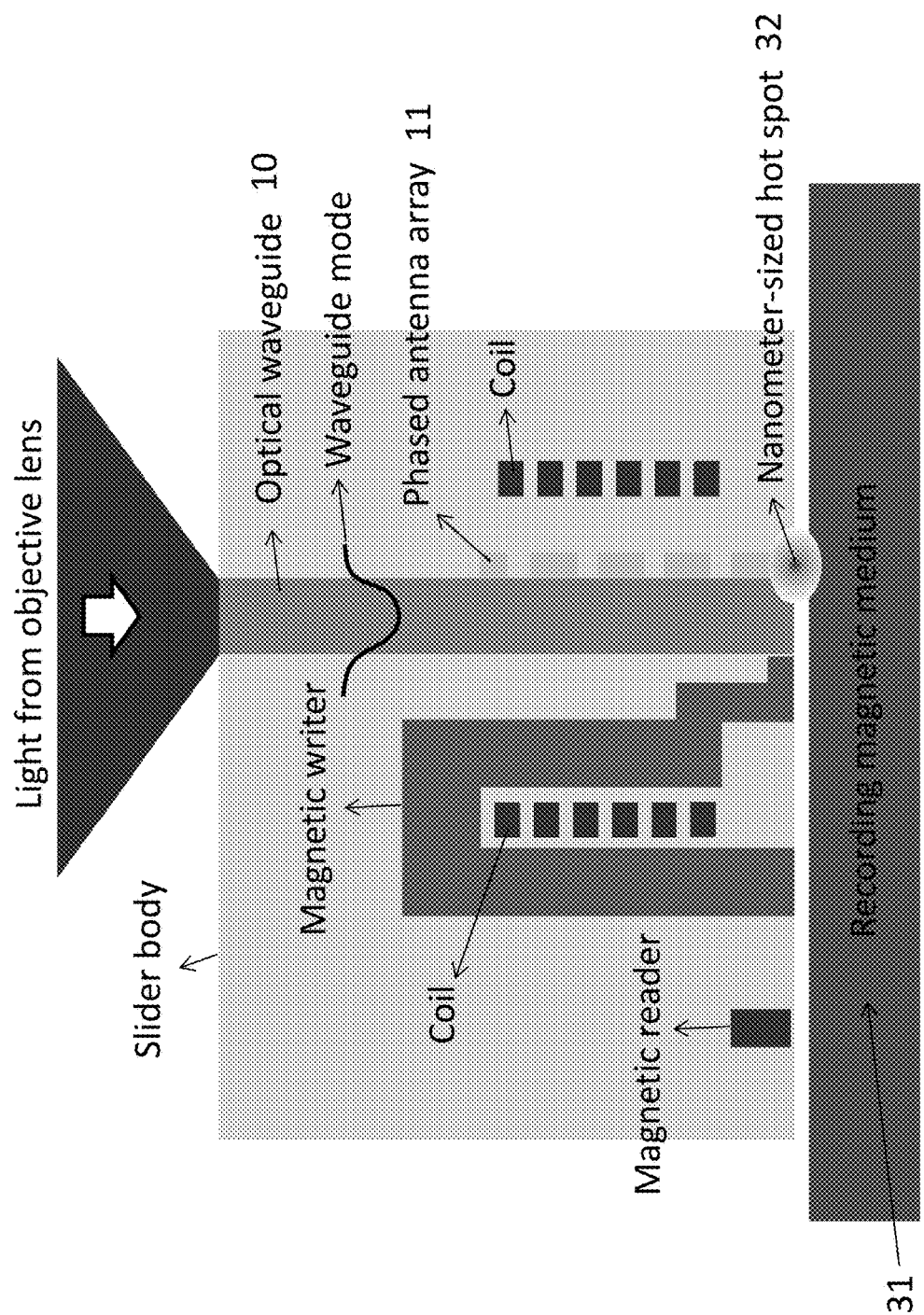
FIG. 13 shows a phased antenna array for heat-assisted magnetic recording. The laser light is first focused into an optical waveguide. The antenna array then couples the waveguide mode into a surface wave propagating along the antenna array. The optical power is eventually concentrated into a nanoscale spot at the edge of the last antenna in the array to heat the magnetic recording media.

FIG. 13 shows a phased antenna array for heat-assisted magnetic recording. The schematic shows that a phased optical antenna array focuses optical power propagating in the waveguide 10 on to a hot spot 32 at the tip of the last antenna, which is used for heat-assisted magnetic recording. Heat-assisted magnetic recording is a promising approach for enabling large increases in the storage density of hard disk drives. A laser is used to momentarily heat the recording area 31 of the medium to reduce its coercivity so that the applied magnetic field from the recording head can write bits of information into the recording media more easily.

One challenge in this technology is to create a nanoscale spot of concentrated light as the heating source. The existing solution is to use a waveguide to bring laser light to the facet of the recorder where a single optical antenna concentrates a portion of the light into a hot spot. This configuration cannot use the entire laser optical power and the reflected light from the recorder facet will be guided by the waveguide back to the laser, which makes the emission of the laser unstable. Efficient coupling of light output from laser to the waveguide is also a problem. Phased optical antenna arrays 11 patterned on optical waveguides 10 can be a solution to these problems. The antenna array 11 can convert all the waveguide mode into surface waves 21 propagating along the antenna array and concentrate the optical power at the tip of the last antenna in the array, creating a hot spot. In this way, a majority of optical power is used for magnetic recording and there is very little reflection back into the waveguide. Phased optical antenna arrays 11 can also help optical impedance match between laser emission and waveguide modes so that more power can be coupled into the waveguide from the laser.

Figure 14:
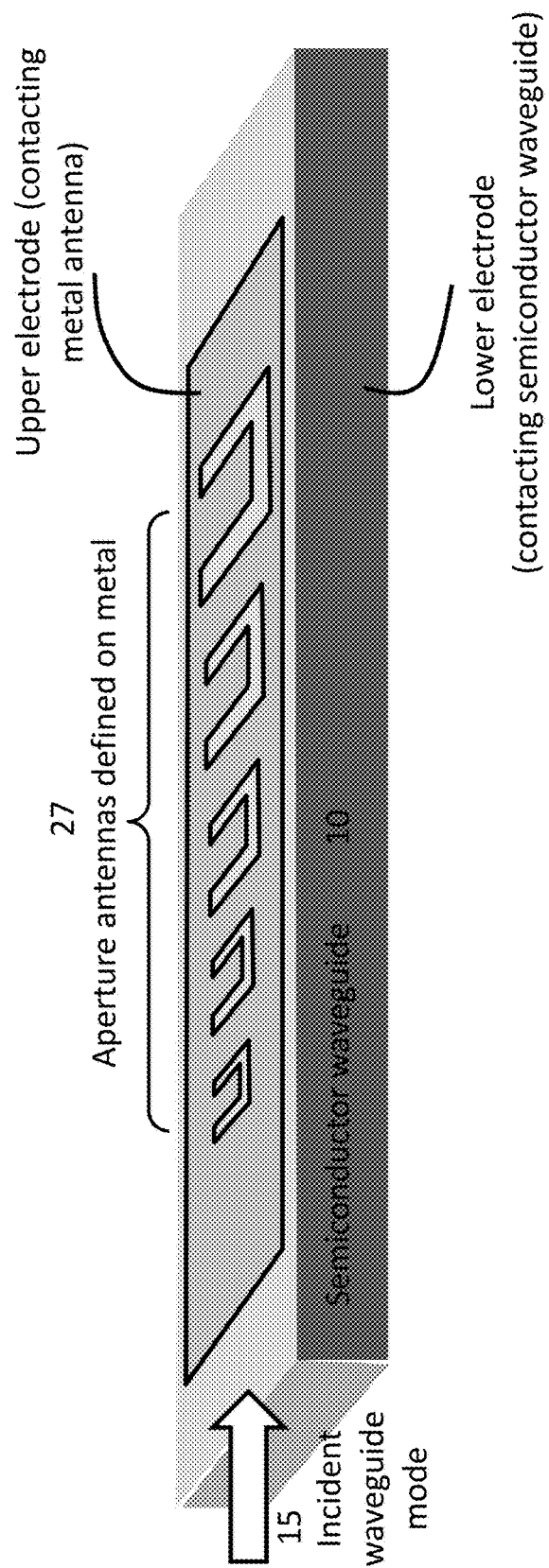
FIG. 14 shows an integrated photodetector based on an array of aperture antennas defined on a metallic film, which sits on the top of a semiconductor waveguide.

FIG. 14 shows an exemplary integrated photodetector based on phased antenna arrays. In FIG. 14, the waveguide 10 is made of a thin gold film with U-shaped aperture antennas cut into the film 27, though apertures of other shapes and other metals can be used. The fact that phased optical antennas can convert waveguide modes 15 into surface waves can be used to build efficient and small-footprint photodetectors. The concentrated optical power associated with surface waves can enhance optical absorption in the waveguide materials, which enables us to build small photodetectors that respond quickly to digitized optical information. Integrated infrared photodetectors can be built based on internal photoemission of hot electrons at metal-semiconductor contacts (i.e., Schottky contacts). The contacts can be between metallic phased optical antennas and the semiconductor optical waveguides. The metallic phased optical antennas concentrate the optical power of the guided wave onto the neighborhood of the metallic structures, thereby mediating the internal photoemission process.

FIGS. 15A-15B shows an example of efficient, broadband integrated nonlinear optical device for second-harmonic generation based on dielectric phased-array antennas. The essential condition for ensuring efficient nonlinear optical processes (e.g., second harmonic generation, difference frequency generation, and four-wave mixing) is to satisfy phase matching condition. Under this condition, the generated optical signal at a frequency other than the frequency of the pump light will constructively build up; in other words, optical power will be continuously transferred from the pump(s) to the desired signal. Otherwise, the intensity of the desired signal could vary periodically along the propagation direction and will not build up.

Conventional methods of achieving a phase matching condition in optical waveguides use periodically pulled nonlinear crystals. The periodic modulation of the nonlinear coefficient will produce an effective wavevector proportional to the inverse of the period to assist phase matching between pumps and generated signals. This method can only be applied to a limited number of nonlinear crystals and is expensive.

The disclosed concept uses the effective wavevector provided by the phased optical antennas to help achieve the phase matching condition. The antenna arrays are patterned on optical waveguides and made of dielectrics so that there is no absorption loss of the pumps and the desired signals. Full-wave simulations demonstrate generation of second-harmonic component (i.e., doubling of the pump frequency) based on this concept. FIG. 15A shows the schematic top view of the device consisting of a waveguide 10 made of nonlinear optical materials and patterned with dielectric phased-antenna arrays. Three antenna arrays 11 are shown, though that number is merely an example. FIG. 15B shows a full-wave simulation of the power of the generated second-harmonic component at λ=2 μm as a function of the propagation distance. The power increases as the number of the antenna arrays increases. The results are comparable to those obtained with periodically pulled nonlinear crystals. The same concept can be easily adapted to realize other nonlinear processes such as third-harmonic generation, difference/sum frequency generation, and four-wave mixing. The concept is very versatile and can be applied to any nonlinear optical materials.

Figure 16B:
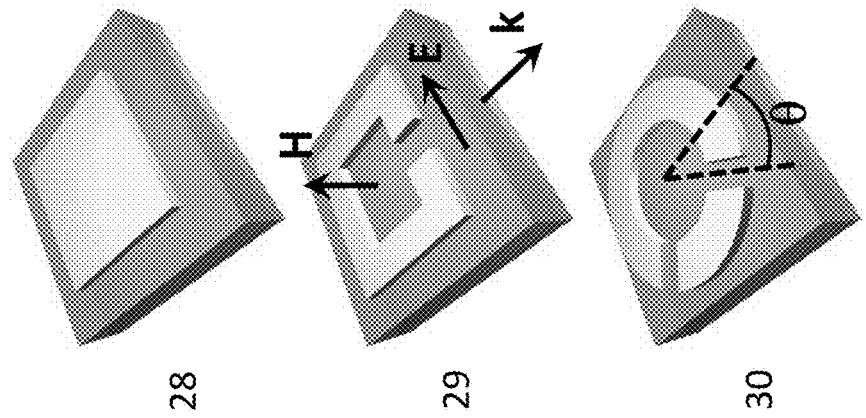
FIG. 16B shows several designs of the unit cell of the two-dimensional phased antenna array.
Figure 16A:
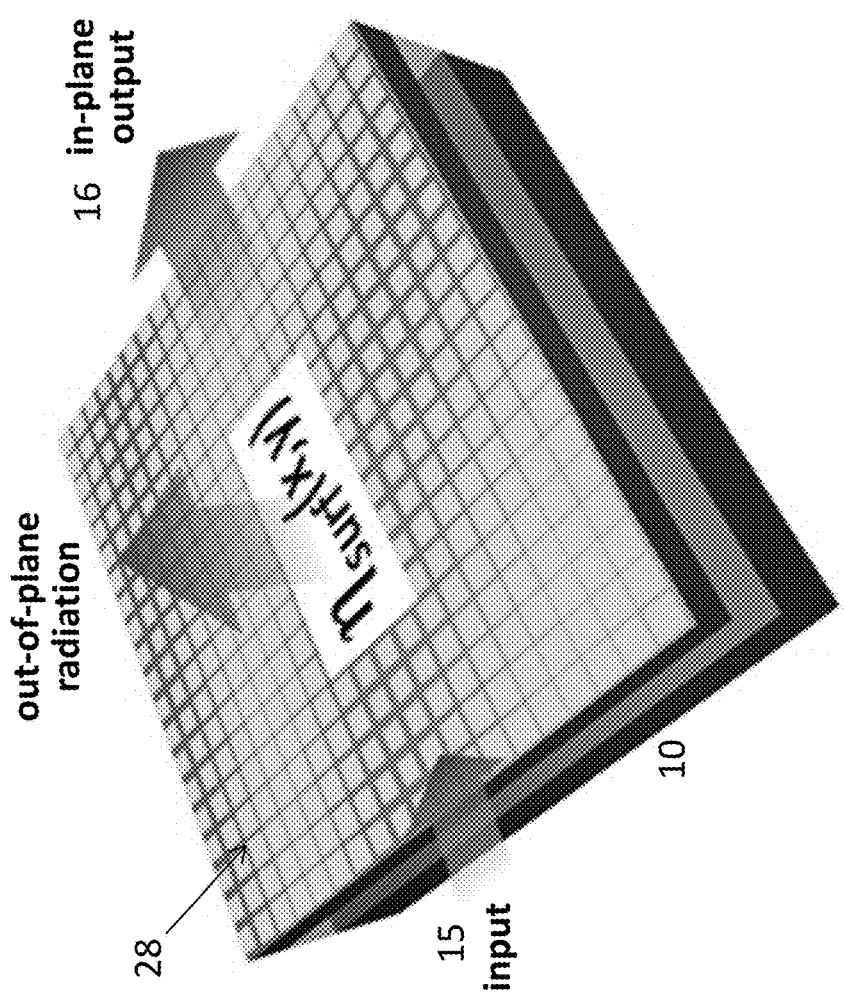
FIG. 16A shows a two-dimensional phased antenna array for controlling propagation of guided waves on a plane or for coupling between two-dimensional guided waves and waves in free space.

FIGS. 16A-16B shows an example two dimensional phased antenna arrays for controlling propagation of guided waves on a plane or for coupling between two dimensional guided waves and waves in free space. FIG. 16A is a schematic generalization of the one dimensional phased antenna array described previously that allows the antennas to extend in two directions in order to control the flow of light along the two dimensional plane. FIG. 16B shows several possible designs of the constituent elements of the two dimensional antenna arrays 28-30.

Figure 17A:
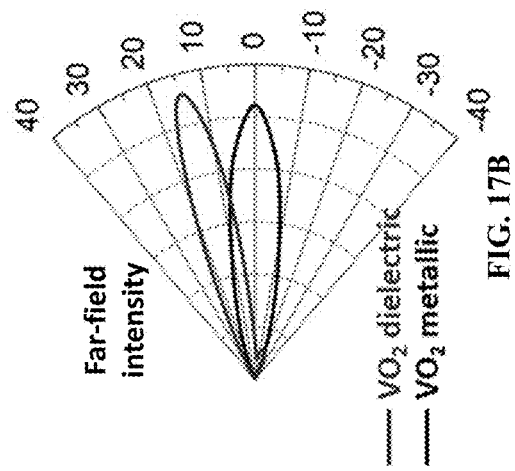
FIGS. 17A-17D show in-plane beam steering based on a two-dimensional phased antenna array.
Figure 17B:
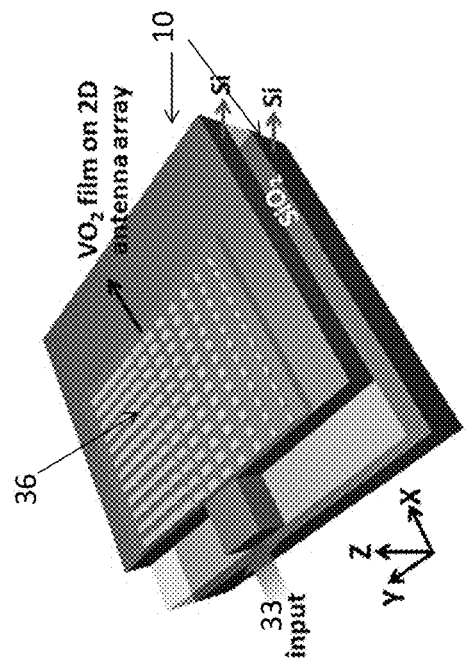
Figure 17D:
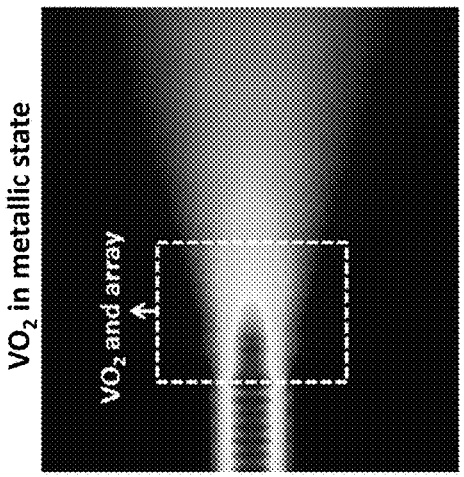
Figure 17C:
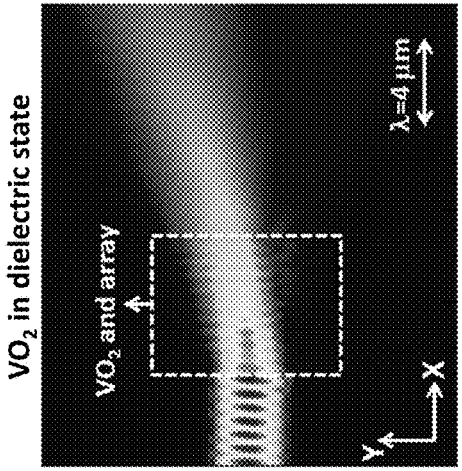

FIGS. 17A-17D show control of in-plane wave propagation using two dimensional phased antenna arrays. FIG. 17A shows a schematic of an exemplary device, which consists of a two dimensional phased antenna array patterned on a slab optical waveguide and covered by a thin film of vanadium dioxide. FIG. 17B shows the angular distributions of optical power in the slab waveguide when the vanadium dioxide film is switched between a dielectric state and a metallic state. FIG. 17C is the top view of the device showing that the optical beam steers upwards. FIG. 17D is the top view of the device showing that the beam goes straight along the X-axis.

An optical isolator decouples lasers from the rest of the optical network and is an important element in integrated optical circuits. An optical isolator will not change the order and/or the polarization of the waveguide modes. Theoretically, it is only possible to create optical isolators using magnetic fields, nonlinear optical effects, or by time-varying optical response. Magnetic materials and magnets are incompatible with integrated photonics. Nonlinear optics effects will change the frequency of light. A remaining option is to use time-varying optical response to realize optical isolators. Time varying optical response can be introduced into optical devices using materials with tunable optical properties. A good choice in the telecommunications and mid-infrared spectral range is graphene, highly doped semiconductors, semiconductor quantum wells, or vanadium dioxide, whose optical conductivity can be tuned by using a bias voltage, by applying an optical excitation, by using a magnetic field, or by tuning the temperature. Traveling electromagnetic waves can be propagated along a certain direction through the waveguide by modulating in sequence graphene-loaded optical antennas patterned on the waveguide and thereby demonstrating optical isolation effects.

Figure 18:
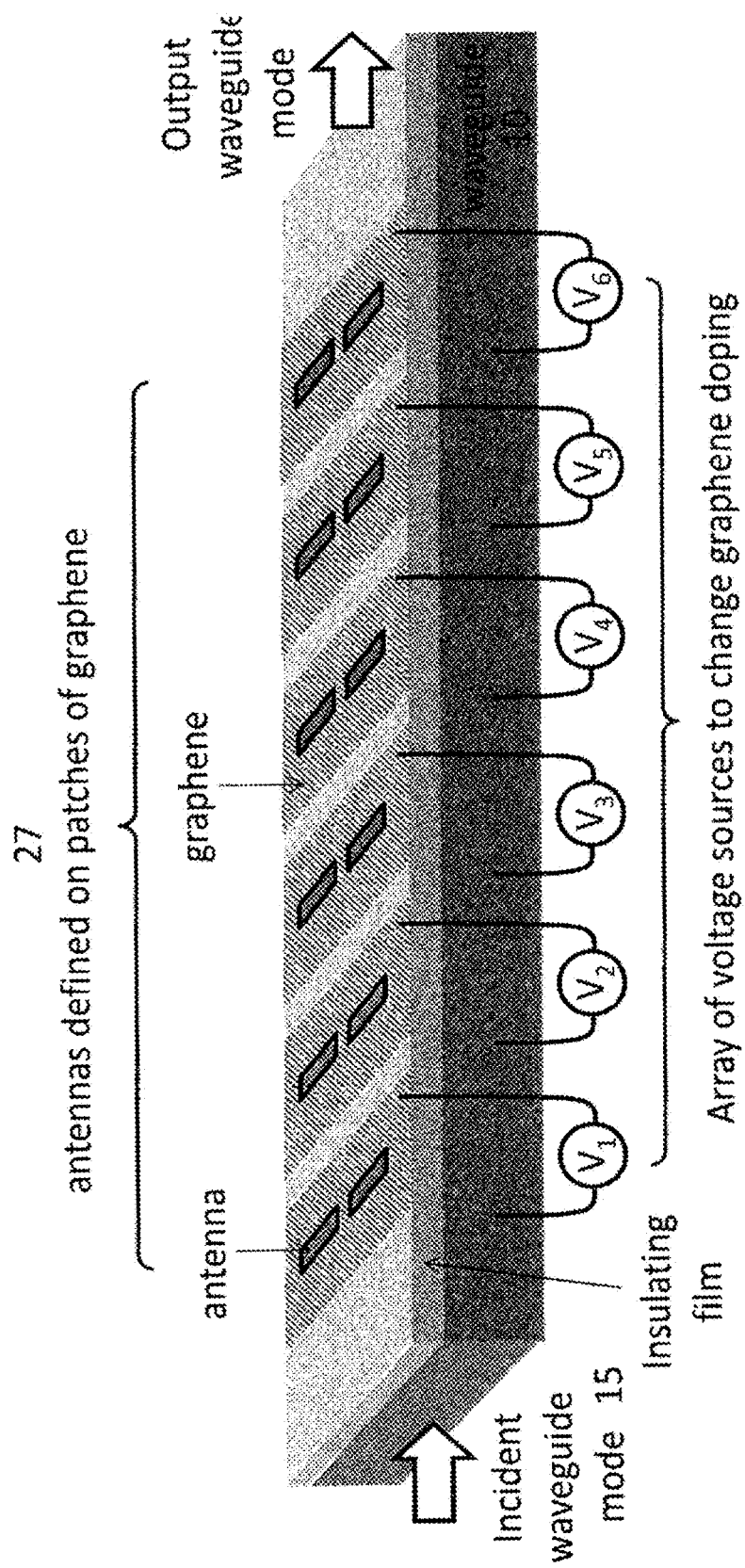
FIG. 18 shows a schematic of an optical isolator.

FIG. 18 shows a schematic of an optical isolator. Each antenna in the array is loaded with a piece of graphene (or other materials with a tunable optical refractive index) and is biased by a different voltage. In this way, the optical response (amplitude, phase, polarization, and optical impedance) of the antenna array can be dynamically controlled. A time-varying optical modulation can be introduced along the optical waveguide, and this modulation will break the symmetry of light propagation in the waveguide, giving rise to the optical isolation effect (i.e., one-way transmission of a waveguide mode through the waveguide but the mode order and the polarization of the mode remain unchanged).

Figure 19:
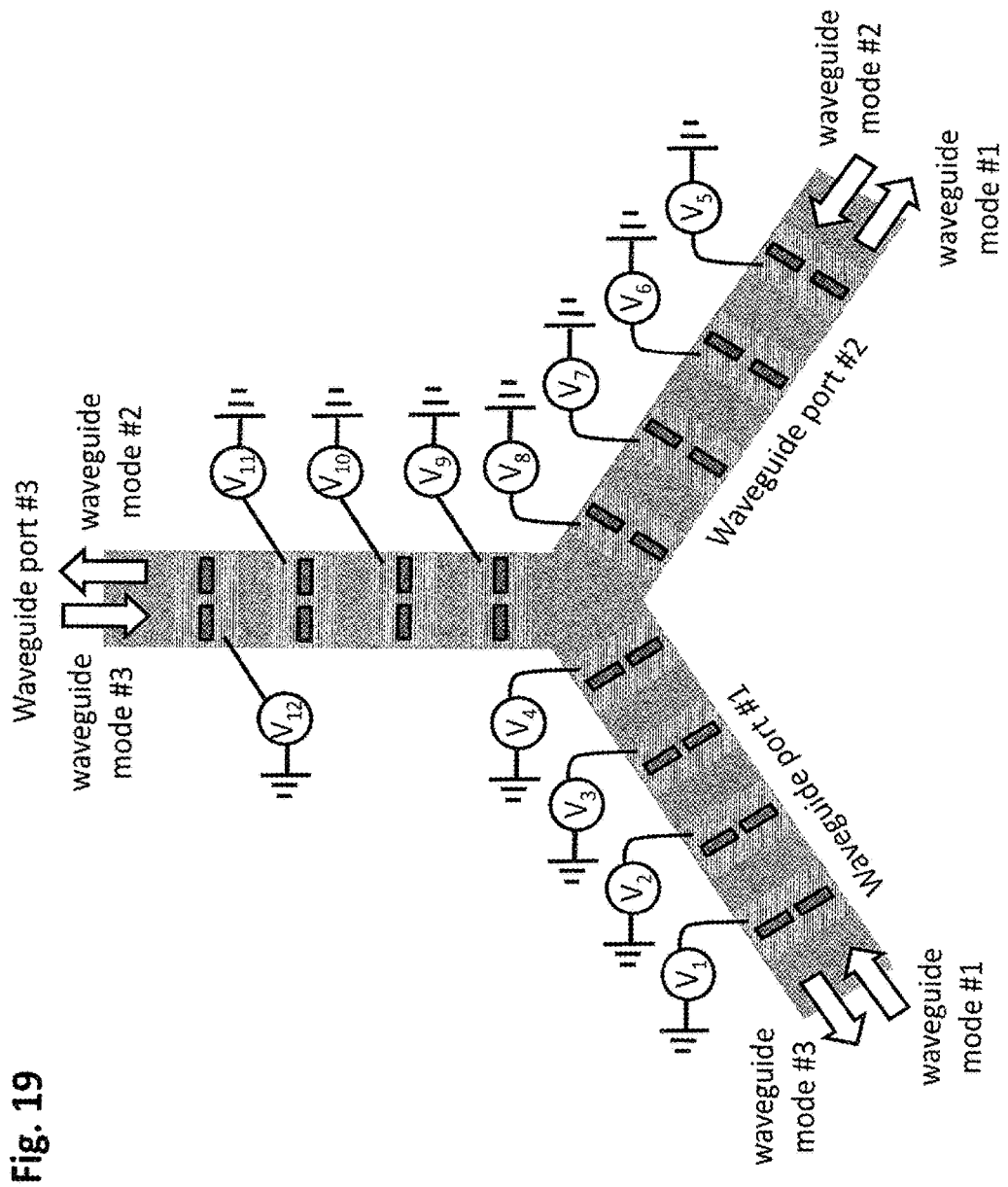
FIG. 19 shows a schematic of an optical circulator.

FIG. 19 shows a schematic of an optical circulator, which is similar to an optical isolator but has multiple waveguide ports. Each waveguide port is patterned with an antenna array and each antenna is loaded with a piece of graphene (or other materials with a tunable optical refractive index) and is biased by a different voltage. The circulator only allows an optical signal to go from port #1 to port #2, from port #2 to port #3, and from port #3 to port #1.

Compared with conventional waveguide-based integrated photonic components, devices according to the disclosed subject matter made of optical waveguides patterned with phased optical antenna arrays have a number of unique advantages:

(1) By engineering the array factor (i.e., properly choosing the spacing and phase difference between array elements, as well as the number of array elements), the devices can realize broadband phase matching between two waveguide modes, which is important for applications such as waveguide mode conversion and on-chip nonlinear optical processes.

(2) The devices can realize highly selective mode conversion by using the "selection rules" that govern the interaction strength between antennas and a particular waveguide mode. The selection rules are controlled by the geometries of the antenna array (e.g., the lateral offset between antenna array and the waveguide axis, and the antenna's orientation angle with respect to the waveguide axis).

(3) Antenna emissions have field components polarized in both the in-plane and out-of-plane directions with respect to the substrate. Antennas can thus mediate a strong interaction between the TE and TM waveguide modes and help realize polarization rotation in integrated photonic circuits. The coupling between TE and TM modes is otherwise extremely weak in optical waveguides with symmetric cross-sections.

(4) Owing to the strong interaction between guided modes and antennas, mode conversion, total optical power absorption, and photodetection can be accomplished within an extremely short propagation distance (i.e., a few free-space wavelengths).

(5) The optical losses of the devices are low because metals in the telecommunications and mid-infrared spectral range have high optical conductivity, and because antenna reradiations are primarily captured by the waveguides, with negligible optical power scattered into free space or into the substrates. Furthermore, by using dielectric phased antennas, the devices can substantially reduce optical absorption in antennas and realize, for example, waveguide mode conversion and on-chip nonlinear optical processes with high energy efficiency.

The disclosed subject matter can yield miniature, lightweight, broadband integrated photonic devices, which can create new devices that can replace their bulky and heavy counterparts currently in use. In some embodiments of the disclosed subject matter, the integrated photonic devices can be adapted for electromagnetic waves of different wavelengths, including visible, near-infrared (especially telecommunications wavelengths of 1.3-1.55 μm), mid-infrared (3-30 μm), far-infrared (30 μm to 1 mm), and microwave and radio wavelengths (i.e., wavelengths longer than 1 mm).

One skilled in the art will understand that proper transparent materials should be chosen for different wavelength ranges. In the visible spectral range, one can choose from a great variety of glasses or crystals. In the telecommunications wavelength range, it is best to use CMOS compatible materials such as silicon or $Si_3N_4$. In the mid-infrared wavelength range, mid-infrared transparent materials such as silicon, germanium, GaAs, $CaF_2$, $MgF_2$, and $BaF_2$ should be selected. In the far-infrared wavelength range, one can use silicon, GaAs, and a number of plastics. In the microwave and radio wavelengths, one can use a number of plastics. Nonlinear optical materials for optical waveguides used in the on-chip nonlinear optical elements can be $LiNbO_3$, GaAs, $LiTaO_3$, Potassium dihydrogen phosphate (KDP), and Potassium titanyl phosphate (KTP).

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. An integrated photonic device comprising:
   an antenna array having a plurality of antennas, wherein each of the plurality of antennas is configured to have a variable phase difference with an adjacent antenna associated with one or more phase differences for the antenna array; and
   an optical waveguide coupled to the antenna array and formed by one or more materials that controls the propagation of light through the waveguide by converting at least one optical parameter of the propagating light based on a set of parameters of the one or more materials and the one or more phase differences of the antenna array.

2. The integrated photonic device of claim 1, wherein the antenna array is disposed on top of the waveguide, inside the waveguide, underneath the waveguide, or proximate the side of the waveguide.

3. The integrated photonic device of claim 1, wherein the antenna array comprises metallic or dielectric materials.

4. The integrated photonic device of claim 1, wherein each of the plurality of antennas is spaced equally or unequally.

5. The integrated photonic device of claim 1, wherein each of the plurality of antennas comprises a same or different shape.

6. The integrated photonic device of claim 1, wherein each of the plurality of antennas is spaced no more than one free space wavelength from another antenna, and wherein the antenna array has a length no more than one hundred times the free space wavelength.

7. The integrated photonic device of claim 1, wherein the antenna array is configured to introduce a spatial distribution of optical phase.

8. The integrated photonic device of claim 7, wherein the optical phase has a linear distribution along the waveguide.

9. The integrated photonic device of claim 7, wherein the optical phase has a nonlinear distribution along the waveguide.

10. The integrated photonic device of claim 1, wherein the antenna array is configured to introduce a spatial distribution of optical amplitude.

11. The integrated photonic device of claim 1, wherein the antenna array is configured to introduce a spatial distribution of optical polarization.

12. The integrated photonic device of claim 1, wherein the antenna array is configured to introduce a spatial distribution of optical impedance.

13. The integrated photonic device of claim 1, wherein the antenna array is configured to introduce two or more of spatial distributions of phase, amplitude, polarization, and optical impedance.

14. The integrated photonic device of claim 1, configured to form an optical waveguide mode converter.

15. The integrated photonic device of claim 14, wherein the mode converter is adapted for use in a mode-division multiplexing or demultiplexing system.

16. The integrated photonic device of claim 1, configured to form a polarization rotator.

17. The integrated photonic device of claim 16, wherein the polarization rotator is adapted for use in a polarization-division multiplexing or demultiplexing system.

18. The integrated photonic device of claim 1, configured to form an absorber of optical power.

19. The integrated photonic device of claim 1, configured to form an optical power diode.

20. The integrated photonic device of claim 1, configured to create a nanoscale hot spot of light for heat-assisted magnetic recording.

21. The integrated photonic device of claim 1, configured to form a photodetector based on internal photoemission, wherein the waveguide comprises a semiconductor and wherein the antenna array comprises a plurality of aperture antennas defined in a metallic film.

22. The integrated photonic device of claim 1, configured to form a nonlinear optical element, wherein the waveguide comprises one or more optical nonlinear materials and wherein the antenna array is configured for phase matching between different waves participating in the nonlinear optical process.

23. The integrated photonic device of claim 1, configured as an optical isolator, wherein the antenna array is proximate materials having a tunable optical refractive index.

24. An optical circulator comprised of a plurality of the integrated photonic devices of claim 23, further configured for routing an optical signal to a predetermined optical waveguide at a junction of waveguides.

25. The integrated photonic device of claim 1, wherein the antenna array comprises a two-dimensional array and the waveguide comprises a two-dimensional slab waveguide.

26. The integrated photonic device of claim 1, wherein the antenna array comprises metallic or dielectric materials, the waveguide comprises near-infrared transparent material, and wherein the device is adapted for electromagnetic waves having telecommunications wavelengths from 1.3 to 1.6 μm.

27. The integrated photonic device of claim 1, wherein the antenna array comprises metallic or dielectric materials, the waveguide comprises mid-infrared transparent material, and wherein the device is configured for mid-infrared wavelengths of 3 to 30 μm.

28. The integrated photonic device of claim 1, wherein the antenna array comprises metallic or dielectric materials, the waveguide comprises far-infrared transparent material, and wherein the device is configured for far-infrared wavelengths of 30 μm to 1 mm.

29. The integrated photonic device of claim 1, wherein the antenna array comprises metallic or dielectric materials, the waveguide comprises microwave and radio transparent material, and wherein the device is configured for microwave and radio wavelengths longer than 1 mm.

30. A plurality of the integrated photonic devices of claim 1, configured to form an optical waveguide mode converter and a polarization rotator adapted for use in a hybrid mode-and polarization-division multiplexing or demultiplexing system.

* * * * *